US 6,405,213 B1

(12) United States Patent
Layson et al.

(10) Patent No.: US 6,405,213 B1
(45) Date of Patent: Jun. 11, 2002

(54) SYSTEM TO CORRELATE CRIME INCIDENTS WITH A SUBJECT'S LOCATION USING CRIME INCIDENT DATA AND A SUBJECT LOCATION RECORDING DEVICE

(76) Inventors: Hoyt M. Layson, 3052 Enisglen Dr., Palm Harbor, FL (US) 34683; Gregory A. Frost, 1463 Covey Ride, Tallahassee, FL (US) 32312-9664

( * ) Notice: Subject to any disclaimer, the term of this patent is extended or adjusted under 35 U.S.C. 154(b) by 0 days.

(21) Appl. No.: 09/330,858

(22) Filed: Jun. 11, 1999

Related U.S. Application Data

(63) Continuation-in-part of application No. 09/082,313, filed on May 2, 1998, now Pat. No. 5,982,281, which is a continuation-in-part of application No. 09/181,244, filed on Oct. 28, 1998, which is a continuation-in-part of application No. 08/863,158, filed on May 27, 1997, now Pat. No. 5,959,533.

(51) Int. Cl.$^7$ .............................................. G06F 17/00
(52) U.S. Cl. .................... 707/104; 340/539; 340/573.1; 340/825.36
(58) Field of Search ................ 707/1, 206; 340/825.36, 340/825.71, 539, 573.1

(56) References Cited

U.S. PATENT DOCUMENTS

| | | | |
|---|---|---|---|
| 4,918,432 A | 4/1990 | Pauley et al. ................ 340/573 |
| 5,293,642 A | 3/1994 | Lo ............................ 455/33.1 |
| 5,497,149 A | 3/1996 | Fast .......................... 340/988 |
| 5,528,248 A | 6/1996 | Steiner et al. ............... 342/357 |
| 5,548,583 A | 8/1996 | Bustamante .................. 370/18 |
| 5,583,776 A | 12/1996 | Levi et al. ................... 364/450 |
| 5,625,668 A | 4/1997 | Loomis et al. ................ 379/58 |
| 5,627,548 A | 5/1997 | Woo et al. ................... 342/357 |
| 5,684,761 A | 11/1997 | Chen et al. .................. 368/204 |
| 5,712,619 A | 1/1998 | Simkin ........................ 340/539 |
| 5,714,931 A | 2/1998 | Petite et al. ................. 340/539 |
| 5,730,808 A | 3/1998 | Yang et al. .................. 136/249 |
| 5,731,757 A | 3/1998 | Layson, Jr. .................. 340/573 |
| 5,731,785 A | 3/1998 | Lemelson et al. ........... 342/357 |
| 5,742,233 A | 4/1998 | Hoffman et al. ............. 340/573 |
| 5,742,509 A | 4/1998 | Goldberg et al. ........ 364/449.5 |
| 5,748,148 A | 5/1998 | Heiser et al. ................ 342/457 |
| 5,773,993 A | 6/1998 | Trimberger ................... 326/38 |
| 5,779,817 A | 7/1998 | Wecker ....................... 136/293 |
| 5,917,425 A * | 6/1999 | Crimmins et al. ...... 340/825.49 |
| 6,031,454 A * | 2/2000 | Lovejoy et al. ............. 340/539 |
| 6,175,308 B1 * | 1/2001 | Tallman et al. ............. 340/539 |

OTHER PUBLICATIONS

Lincoln et al., "Towards pose–independent face recognition", 2000, Visual Biometrics, IEE Colloquium on, 2000, pp. 5/1 to 5/5.*

Patel et al., The impact of forensic computing on telecommunications:, Nov. 200, IEEE Communications Magazine, vol. 38, Issue 11, pp. 64–67.*

* cited by examiner

Primary Examiner—Jack Choules
(74) Attorney, Agent, or Firm—Holland & Knight LLP

(57) ABSTRACT

A system for correlating crime incidents with the location of a subject in which crime incident data containing information about the location and time of at least one crime and subject location data containing information about the locations at various times of a plurality of subjects are provided to a correlation database of a computer, whereupon the correlation computer correlates the crime incident data and the subject location data to determine if each of said subjects are likely suspects of said crime based upon whether each of the subjects were proximate to the location of the crime at the time of the crime.

44 Claims, 24 Drawing Sheets

SYSTEM TO CORRELATE CRIME INCIDENTS WITH A SUBJECT'S LOCATION USING CRIME INCIDENT DATA AND A SUBJECT LOCATION RECORDING DEVICE

RELATED APPLICATIONS

This application is a continuation-in-part application of OFFENDER AND VICTIM COLLISION AVOIDANCE AND ADVANCED WARNING SYSTEM, Ser. No. 09/082,313, filed May 2, 1998 now U.S. Pat. No. 5,982,281, BODY WORN ACTIVE AND PASSIVE TRACKING DEVICE, Ser. No. 09/181,244, filed Oct. 28, 1998 and TAMPER DETECTION FOR BODY WORN TRANSMITTER, Ser. No. 08/863,158, filed May 27, 1997 now U.S. Pat. No. 5,959,533, the disclosures of which are hereby incorporated by reference herein.

BACKGROUND OF THE INVENTION

1. Field of the Invention

This invention relates to recording the movements of persons, specifically subjects under court ordered supervision. More particularly, this invention relates to correlating crime incident data with the history of a subject's locations by using an all body worn, non-removable, tamper resistant location recording apparatus. The location recording apparatus that when integrated with a communications network, law enforcement information systems, criminal justice and corrections information systems and a central correlation data base system, can perform correlation data processing of crime incidents with a subject's location at the time of the crime incident. This invention further relates to a crime incident and subject location correlation data base system that supports law enforcement and criminal justice investigative queries matching a subject's location history with location and time correlation query criteria. This invention further relates to an all body worn, low power location recording apparatus that when integrated with a residence interface unit attached to a land line telephone at the subject's residence or at locations in the community, transfers the location movement history stored in the subject's location recording apparatus to a central crime incident and subject location correlation data base.

2. Description of the Background Art

Currently, based on a 1997 U.S. Department of Justice report, there are over 3 million adults under court ordered community supervision on either parole or probation. A 1992 study by Langin and Cunniff found that 43% of felons sentenced to community supervision were arrested within 36 months for a new felony offense.

A more comprehensive study was released by the U.S. Department of Justice, Bureau of Justice Statistics in 1995, which reviewed the criminal histories of 300,000 inmates incarcerated in 1991 that were previously on parole or probation. The study documented the crimes committed during the 13 to 17 months prior to their incarceration. While on probation or parole, the inmates murdered 13,200 people, raped 11,600 women and 1,300 men, robbed 39,500 people, assaulted 19,200 victims, burglarized 39,600 homes and businesses and stole 7,900 motor vehicles. These are the resolved crimes. The number of unresolved crimes is unknown, but it is estimated that as much as 30% of all crime is committed by subjects under community supervision. It is therefore no surprise that when crimes are committed in a community, law enforcement's prime suspects include subjects (released criminal offenders) under community supervision. Law enforcement investigative man-power is therefore focused on establishing the location of these subjects during the time of the criminal incident.

Previously, monitoring the location of a person or subject, such as an offender, has been limited to knowing when the offender is at home. The apparatus used for "house arrest" or "electronic monitoring" uses a body worn, non-removable, tamper resistant radio frequency transmitter attached to a subject which communicates to a field monitoring device (FMD) at the subject's residence. The FMD communicates with a central data base system using the subject's telephone line to report when the subject is within a hundred feet of the FMD, as described in U.S. Pat. No. 4,918,432, the disclosure of which is hereby incorporated by reference herein. Once the subject leaves the immediate area of the FMD, the location of the subject is unknown.

Other techniques for locating a subject at a predetermined area utilizes the combination of caller identification and voice recognition. The phone number of the predetermined area is known, a voice signature sample of the subject is captured and voice signature with caller identification is matched, so as to locate the subject at the predetermined location, as described in U.S. Pat. No. 5,170,426, the disclosure of which is hereby incorporated by reference herein. During the time between subject call-in reporting, the location of the subject is unknown.

Currently, determining the location of a person or subject, such as an offender, is possible outside the confines of their respective residence. This apparatus can be seen in U.S. Pat. No. 5,731,757, the disclosure of which is hereby incorporated by reference herein. This apparatus employed on the method is a tamper resistant body worn ankle wireless transmitter that communicates with an associated tamper resistant portable tracking apparatus. The portable tracking apparatus determines its location using Global Positioning System (GPS) satellites. The portable tracking apparatus communicates with a central data base system using wireless communications when portable and land-line communications when placed in a charging stand at the subject's residence or work location. Algorithms in the offender's portable tracking apparatus executing on the processor compare the offender's current location against a schedule of location rules stored in the memory of the offender's portable tracking apparatus. The purpose of a two part tracking device is to place the low power transmitter tag device as the body worn component and the high power consumption devices (i.e. conventional GPS receiver card, processor and memory card and wireless transceiver and data modem card) as an integrated portable unit that requires periodic recharging. The body worn transmitter tag device does not require battery recharging or replacement for extended time periods. If the subject forgets to transport the portable tracking device as the subject's location changes (i.e. from home to work), then the ability to locate the subject is lost. GPS signals are also attenuated by multistory buildings and underground structures which also prevents a subject from being located until the subject emerges from the structure.

Other techniques for locating a subject outside of the confines of their residence or outside a predetermined area use radio frequency triangulation based on ground based tower infrastructure. The principle is based on the strength of a transmitted signal from the subject's apparatus being measured at a minimum of three towers in order to triangulate the position of the subject's apparatus as described in U.S. Pat. No. 5,293,642, the disclosure of which is hereby incorporated by reference herein. Another technique uses time of arrival (TOA) of a spread spectrum signal as described in U.S. Pat. No. 5,548,583, the disclosure of which is hereby incorporated by reference herein. Since both locating techniques use a subject transmitter and require a tower based infrastructure, once the subject leaves the area of tower coverage or the subject's transmitted signal is weakened by being inside structures, the ability to locate the subject is lost.

Another approach to obtaining location, health and status is to poll the offender's and victim's portable tracking apparatus by placing a cellular phone call to the apparatuses which can be seen in U.S. Pat. No. 5,461,390, the disclosure of which is hereby incorporated by reference herein. Polling the body worn device described in U.S. Pat. No. 5,748,148 (the disclosure of which is hereby incorporated by reference herein) is accomplished by a dedicated ground based wireless tower network. These centralized polling approaches consume power by frequently using either traditional cellular communications or dedicated wireless communications that requires the receiver in the body worn or powered device to remain powered to respond to the poll. This is especially the case in higher risk subjects that have a history of predatory crimes.

All of the location techniques described above are focused on immediate reporting of violations of house arrest, inclusion areas or exclusion areas. These systems are either limited in the ability to locate a subject outside a predetermined area, loose signals required to locate the subject as they move about authorized areas or are costly to procure and operate due to frequent wireless radio frequency (RF) communications. For these reasons, less than five percent of subjects under community supervision are monitored by electronic methods (i.e. electronic monitoring, GPS tracking, tower based RF triangulation, voice recognition/caller identification, etc.). Only the most violent, predatory or high profile subjects are supervised by electronic methods. The remaining subjects under community supervision are able to commit crimes of opportunity and violate their conditions of community supervision due to the anonymity of their movements in the community and the inability to correlate their movements to crime incidents.

Currently, crime incident data is recorded in law enforcement computer aided dispatch systems (CAD) and record management systems (RMS). CAD systems record the time and location of dispatch but may not contain the actual time or location of the crime. The crime, such as a burglary, may have occurred earlier than reported or in the case of a corpse, the murder location may be different than the location where the corpse was found. The investigative data establishing the actual time and location of the crime may be found in the RMS. RMS and CAD systems are typically unique to each local law enforcement agency. There is seldom data sharing between adjacent law enforcement agencies therefore similar crime incidents that span local jurisdictions are seldom correlated.

Criminal justice agencies (i.e. court, corrections, parole, probation, etc.) information management systems (IMS) contain criminal history and sentencing data related to felons but are seldom integrated with law enforcement RMS or CAD systems. The subject location data collected by service providers (i.e. electronic monitoring, GPS tracking, tower based RF triangulation, voice recognition/caller identification, etc.) for criminal justice agencies also exists in disparate systems that store the data, but don't share the data with law enforcement agencies.

Recently, a low power, all body worn tracking apparatus was described in pending patent application entitled "BODY WORN ACTIVE AND PASSIVE TRACKING DEVICE", Ser. No. 09/181,244, filed Oct. 28, 1998. This device, while significantly reducing size, weight, and power costs associated with tracking a subject, still incurs size, weight and power associated with wireless radio frequency (RF) communications in a wide area wireless infrastructure. Frequent apparatus health and status data and current real-time location data required for violent, predatory and high profile subjects require frequent RF transmissions across a wide area wireless network (i.e. cellular, PCS, etc.) driving wireless cost, component cost and frequent battery recharging or replacement.

Current technology provides miniaturization of a GPS receiver, processor, memory and display for the purpose of navigation in the form factor of a wrist watch with Casio's GPS watch announcement at the Consumer Electronics Show in January, 1999.

U.S. Pat. No. 5,583,776, the disclosure of which is hereby incorporated by reference herein, describes a GPS dead reckoning device that will track a person walking during periods of denied GPS signal strength such as inside multistory buildings or subterranean structures.

Power generation for rechargeable batteries in the body worn tracking device is preferred to battery replacements since battery replacement provides the opportunity for contamination of the battery terminals and places the body worn device operational integrity responsibility with the subject being tracked. Battery recharging by connection to external power also provides the opportunity for body worn device tampering, contamination of charging leads, personal safety of the subject while attached to the charging power source and the physical constraint of a wire tether to the charging power source.

Recently, an improved swinging type power generator was described in U.S. Pat. No. 5,684,761, the disclosure of which is hereby incorporated by reference herein. The wrist worn device (typically housed in a watch) is based on the Fleming right-hand rule where a wire wound stator cuts magnetic lines of force to generate electricity. This improved device generates a square wave as opposed to a traditional sine wave from swinging arm motion resulting in improved efficiency of mechanically generated power.

Recently, an improved solar cell manufacturing process described in U.S. Pat. No. 5,730,808, the disclosure of which is hereby incorporated by reference herein, can produce tandem solar cells with two benefits; the first benefit is light absorption from ultraviolet, visible and infrared spectrums resulting in power generation from a wider frequency spectrum, the second benefit is the improved process produces thinner solar cells that reduces the size. U.S. Pat. No. 5,779,817, the disclosure of which is hereby incorporated by reference herein, describes a circuit arrangement of solar cells that provides improved power transfer from solar cells to a load such as a rechargeable battery with a reduction in power loss.

U.S. Pat. No. 5,627,548, the disclosure of which is hereby incorporated by reference herein, describes a transparent indium-tin-oxide on sapphire GPS antenna, a single integrated circuit chip that provides a low noise amplifier, down-conversion, timing code processing and navigation processing in a wrist watch form factor with batteries capable of being recharged by solar cells.

Recently, IBM announced a new semiconductor process called silicon on insulator (SOI) which will increase current semiconductor power efficiency by 35 percent, especially for hand-held computers. IBM further announced high volume availability of SOI integrated circuits by mid 1999.

Traditional basic integrated circuits required for a body worn location recording device such as processing, serial communications, parallel communications, memory, discrete input and discrete output can be imported as standard libraries, integrated and implemented on a single field programmable gate array (FPGA) integrated circuit. Such a capability is described by U.S. Pat. No. 5,773,993, the disclosure of which is hereby incorporated by reference herein, and available as a commercial product from XILINX Corporation as the CORE product name.

Clearly, size, weight and power are critical requirements for any body worn locating device. Recent technology described above affords the ability to combine the elements into a wristwatch form factor to provide an all body worn location recording device. Other recent technology described above affords a low power body worn tracking solution through semiconductor SOI technology, matching filter GPS receiver techniques, miniature watch crystal type GPS antenna and current miniaturized processor and memory devices. With significantly reduced power consumption of subsystems required for location recording, improved solar cell wavelength absorption and swinging motion power generation techniques, the capability to produce an all body worn self rechargeable location recording device currently exists.

U.S. Pat. No. 5,497,149, the disclosure of which is hereby incorporated by reference herein, describes a body worn locating device that is recharged using a plug-in wire battery charging interface to an external power source such as a wall power outlet. With technology known at the time of U.S. Pat. No. 5,497,149 and the lack of such technology disclosure in the embodiment of the Patent, it would not be feasible to construct a body worn device in the form factor depicted in FIG. 1 of the Patent. The device described in this Patent if constructed, would require large batteries and frequent battery recharging or battery replacement due to the amount of power consumed from conventional GPS receivers and cellular phone calls to periodically determine the location of the subject wearing the device, especially where unwilling subjects such as released criminal offenders are wearing the locating device where frequent (i.e. multiple times an hour) location points are desired. Other personal tracking devices found in U.S. Pat. Nos. 5,712,619, 5,742,509, 5,742,233, 5,528,248, 5,731,785, 5,714,931, 5,731,785 and 5,625,668, the disclosures of which are hereby incorporated by reference herein, do not address the low power technology required to implement a non removable, tamper resistant, body worn location recording device in a small, lightweight form factor that is either rechargeable using non contacting external power sources or can function for extended periods of time on a replaceable battery.

There exists a need to implement a location recording apparatus for the purpose of recording a subject's movements in the community for subsequent correlation to crime incident data. Active and passive tracking systems described in U.S. Pat. No. 5,731,757 and the functionality described in U.S. patent application Ser. No. 09/082,313 into a single body worn tamper resistant active tracking apparatus are not required to simply record the locations of a subject. For most subjects under community supervision, movements are not restricted other than in general terms (i.e. prostitution areas, drug dealing areas, etc.). Therefore specific exclusion locations (i.e. former victim's residence, victim's place of work, work release, etc.) are not actively monitored for most subjects and therefore do not require an active tracking device. There exists a need for a simple, low cost location recording device that will record the locations of a large segment of the subjects under community supervision to remove their anonymity.

Since most subjects under community supervision can travel freely about the community, movements inside multistory buildings and underground structures are permitted. In the case of denial of GPS signals while the subject is inside buildings and structures, there exists a need for dead reckoning to record the location of the subject during periods of denial of GPS signals.

In the case of small size, light-weight and low power, there exists a need for high density low power FPGA integrated circuit for the discrete digital functions of processor, memory, serial/parallel communications, analog input/output and digital input/output.

For low cost and low power communications, there exists a need for the location recording apparatus to communicate over a short distance using low power infrared communications with a residence interface unit attached to a communications network (i.e. telephone, internet, etc.).

In the case of correlating crime incident data with offender location history, there exists a need for an end-to-end system that; 1) integrates law enforcement RMS and CAD systems across jurisdictional boundaries, 2) integrates law enforcement RMS and CAD systems with subject location history stored in electronic monitoring systems, GPS tracking systems, tower based RF triangulation systems, and voice recognition/caller id locating systems and 3) integrates criminal justice IMS with law enforcement RMS and CAD systems.

Recently, an end-to-end system concept for a low cost, body worn, tamper resistant location recording device and crime incident correlation data base system developed by the authors of this Patent Application, Hoyt M. Layson, Jr. and Gregory A. Frost, was submitted in a 1998 National Institute of Justice investigator funded research proposal titled "Florida CrimeTRAX".

SUMMARY OF THE INVENTION

The problem of implementing an all body worn low cost subject location recording device integrated in an end-to-end system for correlation with crime incident data is solved by this invention. The low cost subject location recording device which is non-removable, tamper resistant, small, lightweight, can be powered by rechargeable or replaceable batteries and provides dead reckoning during GPS outages is accomplished by integrating several recently developed enabling technologies. The integration of subject location data with crime incident data is solved by this invention by integrating location data from current subject electronic locating techniques with isolated law enforcement and criminal justice information systems to support correlation of subject's location with crime incidents.

The problem of sharing crime incident data across jurisdictional boundaries is solved by this invention. The crime incident/offender location database integrates the current isolated and unique law enforcement RMS and CAD systems.

The problem of law enforcement having on-line information regarding criminal justice community supervision sentencing of a subject is solved by this invention. The problem of criminal justice community supervision having knowledge of a subject's current (i.e. just committed) law enforcement misdemeanors and felonies is solved by this invention. The crime incident/offender location correlation database supports investigative inquiries by law enforcement and criminal justice.

The high power consumption manner and high wireless cost of transferring subject location data to a central data base are solved by this invention using lower power consuming infrared wireless communications to a nearby residence interface unit that connects to a low cost communications network (i.e. telephone, Internet, etc.).

Significant power and size reductions can be achieved by integrating several integrated circuit chip devices such as processor, memory, serial input/output, digital input/output, etc.) on a field programmable gate array (FPGA) versus implementing discrete logic integrated circuits on a circuit board. Further power savings of up to 35% can be achieved by implementing all integrated circuits in low power SOI versions of the integrated circuits. Another power saving feature of this invention is the use of very low power infrared communications to transfer large amounts of data between the body worn tracking device and the residence interface unit.

In addition to the power conserving technology described above, improved body motion power generation and solar power generation combined with efficient power transfer technology can be integrated in order to provide body worn device battery charging by a non contacting external charging means.

BRIEF DESCRIPTION OF THE DRAWINGS

The invention can best be understood by those having ordinary skill in the art by reference to the following detailed description when considered in conjunction with the accompanying drawings in which.

DETAILED DESCRIPTION OF THE PREFERRED EMBODIMENT

Figure 1:
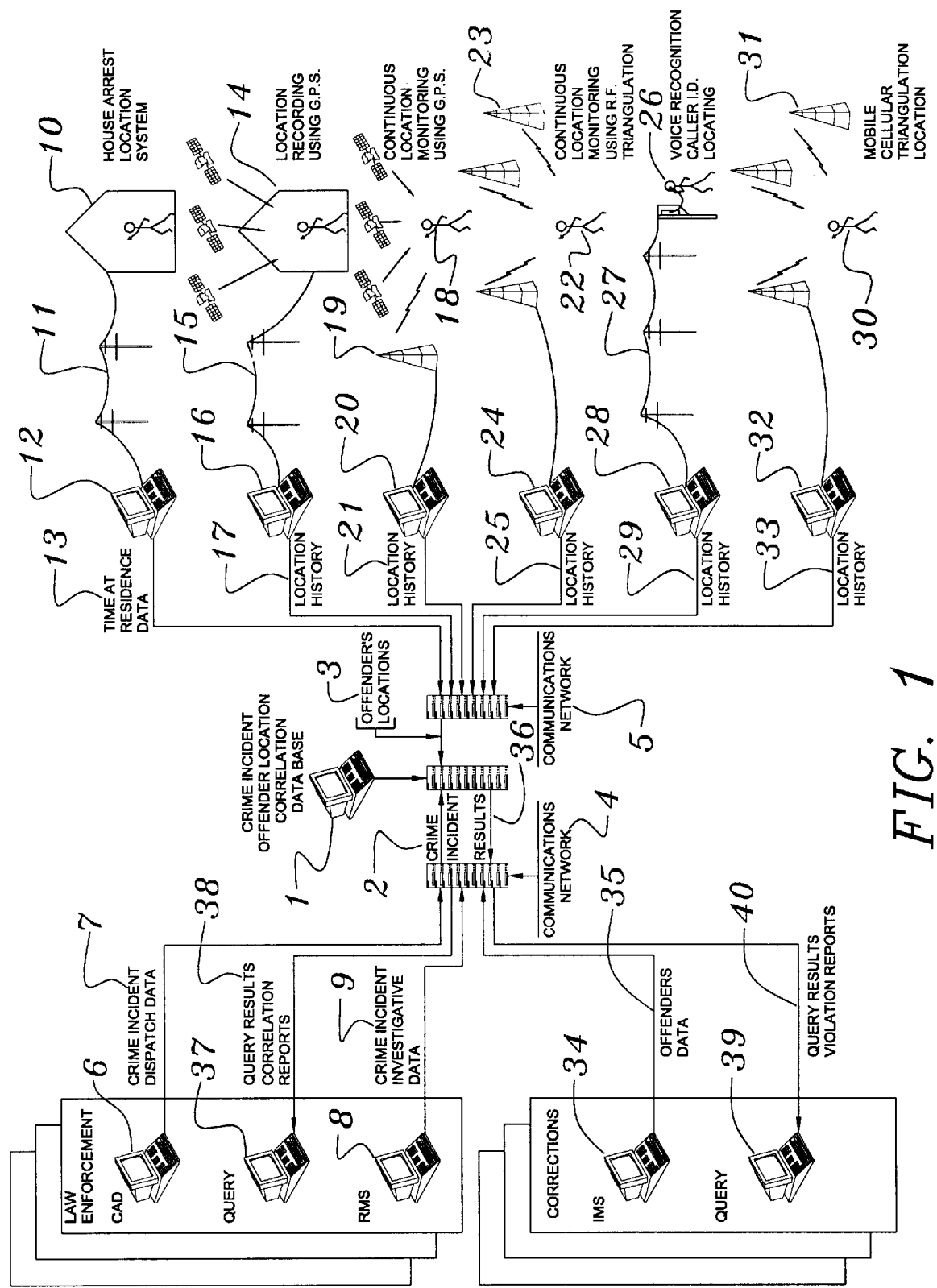
FIG. 1 is a diagram that depicts the end-to-end crime incident/subject location correlation system and its major subsystem elements for integrating subject locating methods with crime incident recording methods.

Throughout the following detailed description, the same reference numerals refer to the same elements in all figures. Subject and offender are used herein to describe the person being located by conventional means or being located by the location recording device described in this patent application. Law enforcement agencies are used herein to describe city, county, state and federal law enforcement and investigative agencies. Corrections agencies are used herein to describe parole, probation, pre-trial sentencing, early release, work release or any form of public/private community supervision.

FIG. 1 depicts the end-to-end crime incident/offender location correlation system and component subsystems. The crime incident/offender location correlation database 1 is a relational data base that receives crime incident data 2 and offender location data 3 on a continuous basis. The crime incident data 2 is delivered to the crime incident/offender location correlation data base 1 by a communications network 4 which can be dial-up, point-to-point, Internet or Intranet based. The offender location data 3 is delivered to the crime incident/offender location correlation data base 1 by a communications network 5 which can be dial-up, point-to-point or Internet based.

Crime incident data 2 is comprised of crime incident dispatch data 7 obtained from computer aided dispatch (CAD) 6 systems and crime incident investigative data 9 from record management systems (RMS) 8 within law enforcement agencies. The crime incident/offender location correlation data base 1 performs data translations, as is known in the art, of the various data representations from unique CAD 6 and RMS 8 systems to arrive at a common data base format for each data item (i.e. date format, time format, etc.). Additional offender data 35 (i.e. sentencing, demographics, criminal history) is provided by information management systems (IMS) 34 within corrections agencies to assist law enforcement with additional information regarding offenders processed by the crime incident/offender location correlation data base 1.

Offender location data 3 is comprised of location data derived from the following sources;

1) House arrest location systems 10 as known in the art that provide location data when the offender is at home,
2) Location recording 14 as described by this invention that collects locations of offenders determined by GPS, on a twenty four hour basis,
3) Continuous location monitoring 18 of offenders determined by GPS as known in the art , on a twenty four hour basis,
4) Continuous location monitoring 22 of offenders determined by RF triangulation as known in the art on a twenty four hour basis, 5) Voice recognition with caller identification locating systems 26 as known in the art that provide location data when the offender calls and 6) Mobile cellular triangulation locating systems 30 as known in the art that provide location data when the offender calls or is called.

The crime incident/offender location correlation data base 1 performs data translations, as is known in the art, of the various data representations from the unique sources of offender location data described above.

House arrest location systems 10 typically use a standard telephone connection 11 to transmit data to a central data base 12 when the offender's body worn tamper resistant transmitter, as is known in the art, is within range of a receiver connected to the phone line 11 at the offender's residence. Additional tamper information for the body worn transmitter and receiver is sent to the central database 12. The offenders time at their residence data 13 is comprised of the offender's residence address, which can be geo-coded into latitude and longitude and the times when the offender is at the residence.

Location recording using GPS 14 uses a body worn location recording device (LRD) that records the location of the offender at programmable time intervals as the offender moves through the community. A receiver, hereinafter referred to as the residence interface unit (RIU), connected to the offender's residence phone line 15 communicates with the body worn location recording device to receive the offender's location history stored in the body worn location recording device. The RIU then communicates over the offender's telephone line 15 to a central database 16. The location history 17 is comprised of time-stamped offender location history and additional tamper information for both the body worn LRD and the RIU.

Continuous location monitoring using GPS 18, uses a body worn tamper resistant transmitter, as is known in the art, and a portable tracking device which has a receiver for the body worn transmitter. The processor and memory continuously monitor the offender's location and compares the current location against inclusion and exclusion locations stored in the portable tracking device. Heartbeat data transmissions comprised of apparatus status, offender location and violation notifications can be sent through the wireless communication network 19 as well as the stored locations of the offender's movements. A central data base facility 20 stores the location data received from the portable tracking device. The location history 21 is comprised of time-stamped offender location history and additional tamper information for both the body worn transmitter and the portable tracking device.

Continuous location monitoring using radio frequency (RF) triangulation 22 uses a body worn tamper resistant transmitter, as is known in the art, to transmit signals which are processed by a tower based network 23 to triangulate the location of the offender. A central data base facility 24 stores the time-stamped location data received from the tower-based network 23. The location history 25 is comprised of time-stamped offender location history and additional tamper information for the body worn transmitter.

Voice recognition caller identification locating systems 26, as known in the art, match the offender's digitized voice signature to the offender's voice when the offender calls on a telephone connected 27 to a central data base facility 28. The central data base facility 28 performs the signal processing to match the offender's call-in voice with the pre-recorded digitized voice signature, performs caller identification and stores the time and location of the offender's phone call. The location history 29 is comprised of time-stamped location history of offender calls to the central data base facility 28.

Mobile cellular triangulation location 30, as is known in the art, triangulates the location of a personal communication device (i.e. a cellular phone, two-way pager, etc.) when the personal communication device transmits data to the cellular towers 31. The central data base facility 32 stores the time and location determined by the cellular network 31. The location history 33 is comprised of time-stamped location history of offender cellular data communications.

The law enforcement query terminal 37 receives automated correlation reports and query results 38 using its connection to the communications network 4. Results 36 from the crime incident/offender correlation data base 1 are comprised of automated correlation of crime incidents to offender locations and structured queries entered by law enforcement personnel.

The corrections query terminal 39 receives automated violation reports and query results 40 using its connection to the communications network 4. Results 36 from the crime incident/offender correlation data base 1 are comprised of automated offender violation reports and structured queries entered by corrections personnel.

Figure 2A:
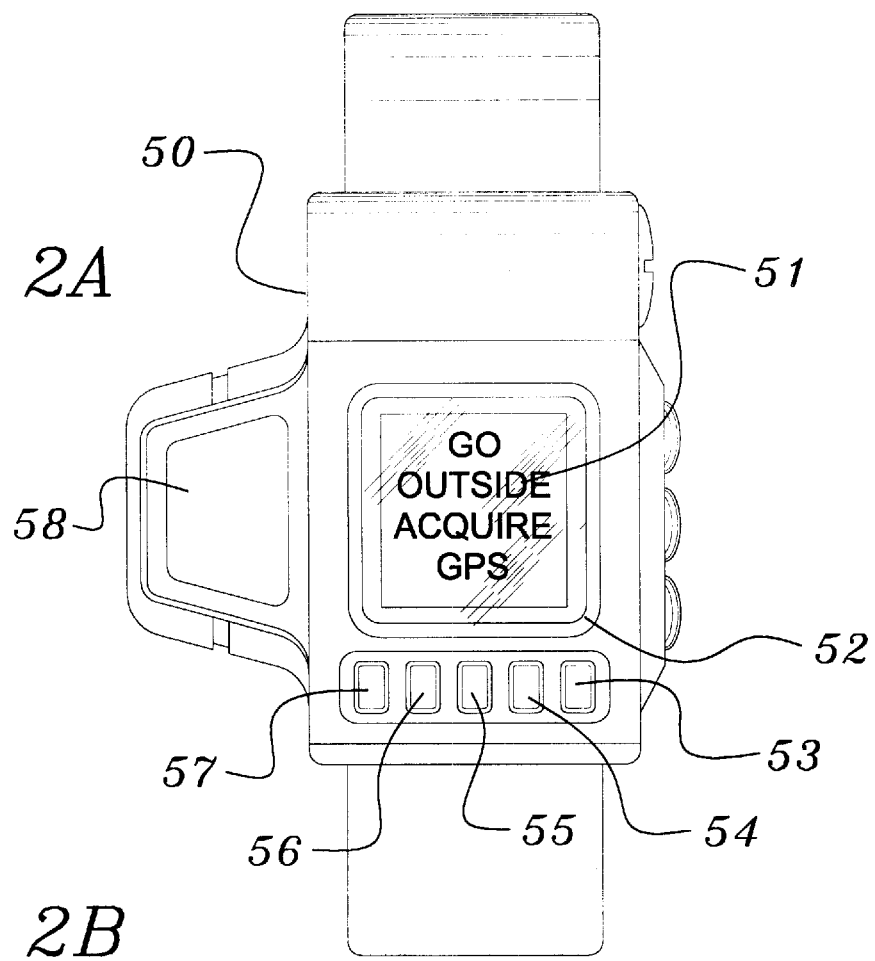
FIGS. 2A, 2B and 2C are plan, side and exploded views of the non-removable, tamper resistant, body worn location recording device of the invention.
Figure 2B:
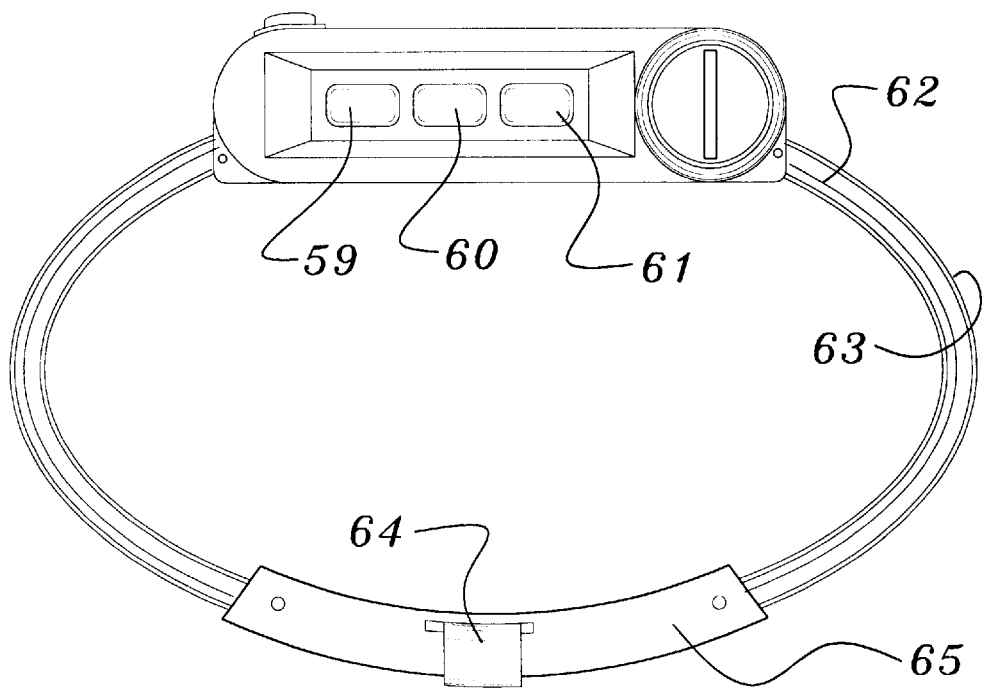
Figure 2C:
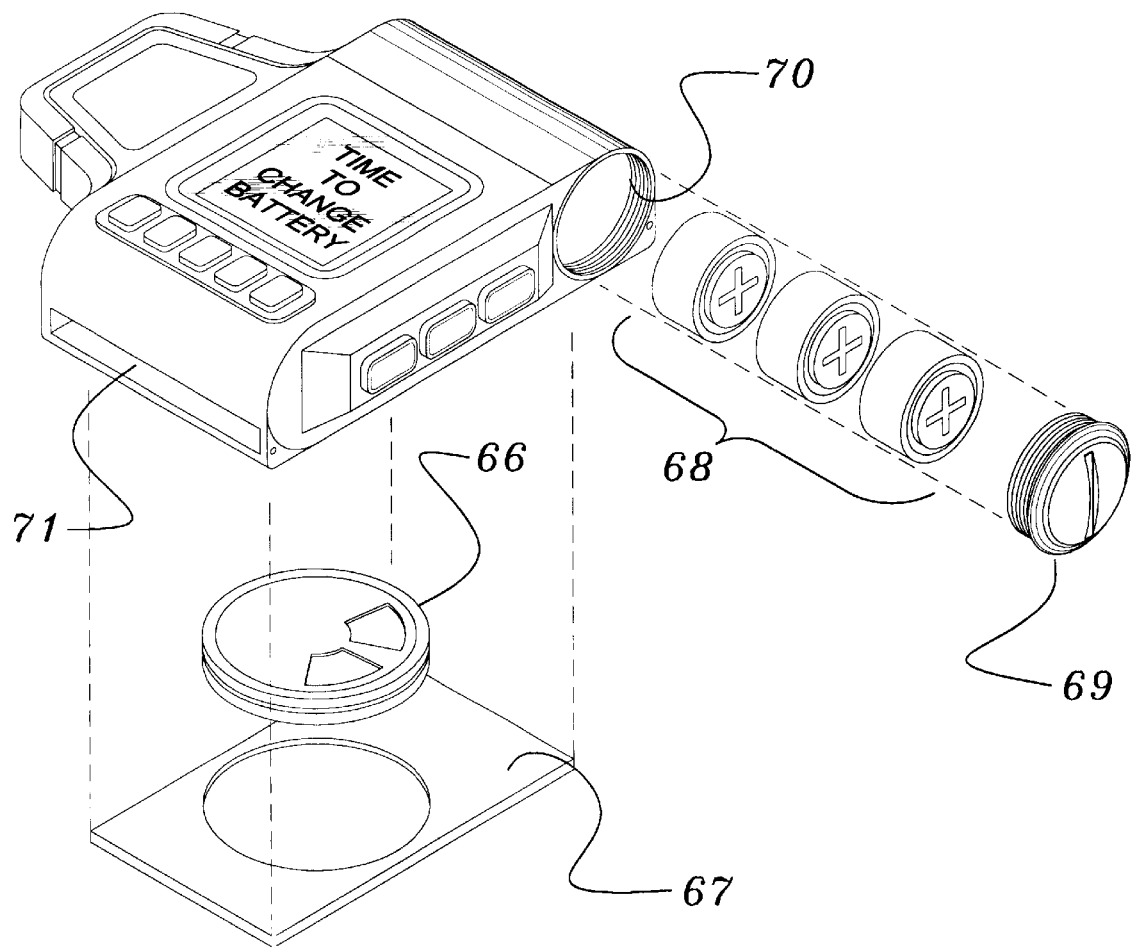

FIG. 2 depicts the body worn LRD 50 and component subsystems. The body worn LRD 50 case is comprised of a high impact plastic 58 that has low attenuation properties for wireless frequencies of GPS to permit incorporation of an enclosed high efficiency active GPS antenna.

The body worn LRD 50 case contains retaining slots 71 for the adjustable attaching strap 63 and strap electrical continuity circuit 62 connections to implement strap tamper detection as is known in the art in the event the strap 63 is severed. The strap 63 incorporates an adjustable hasp 65 as is known in the art and a tamper resistant seal 64 prevents the hasp 65 from being opened without permanently damaging the tamper resistant seal 64. The tamper resistant seal 64 is placed on the hasp 65 at the time the LRD 50 is attached to the subject.

The waterproof battery cover 69 is held in place by screw threads. The waterproof battery cover 69 fits inside a recessed threaded flange 70 which completes a tamper continuity circuit when tightened. The pressure exerted by the water proof battery cover 69 when tightened compresses the lip of the waterproof battery cover 69 against the threaded flange 70 to form a water tight seal. A sealed compartment for the rechargeable/replaceable batteries 68 is formed inside the body worn LRD 50 case with the only opening being sealed by the waterproof battery cover 69. This design does not require the body worn LRD 50 to be removed from the subject in order to replace the batteries 68. Tamper detection screw threads 70 in the body-worn LRD 50 case cause a break in continuity when the waterproof battery cover 69 is loosened.

A swinging power generator 66 described by U.S. Pat. No. 5,684,761 is included herein by reference. The improved swinging power generator 66 described in U.S. Pat. No. 5,684,761 for electric watch battery recharging from swinging arm motion is increased in size to deliver increased power to recharge the battery(s) 68 in the body worn LRD 50 from swinging arm motion. The swinging motion generator 66 design produces a square wave which delivers 30% more power than a sine wave generated by previous swinging motion generators.

The main circuit board 67 is stiffened and the components staked as is known in the art to provide a ruggedized design to withstand shocks generated by arm motion and impacts with objects.

A solar cell array 52 comprised of multi-junction solar cells described in U.S. Pat. No. 5,730,808 and is incorporated herein by reference. There are two advantages to multi-junction solar cells; 1) light absorption in the solar spectrum is expanded to include ultra-violet (UV), visible and infrared (IR) and 2) thinner form factor to absorb the same amount of energy. A broader solar spectrum will produce more power in all conditions of light intensity and artificial light sources such as incandescent.

A low power liquid crystal diode (LCD) display 51 provides time, date and instructional messages for the subject. A scroll up message button 57 and a scroll down message button 56 allows the subject to scroll through large or multiple messages on the display 51. The mode button 55 allows the subject to change the mode of the display 51 (i.e. message, date, time, etc.).

A receive infrared diode 54 allows the body worn LRD 50 to receive data and commands from the residence interface unit (RIU). A transmit infrared diode 53 allows the body worn LRD 50 to send data and commands to the RIU.

A piezo 60 device, as known in the art, provides an audible means to alert the subject of a message on the display 60. A piezo acknowledge button 59 provides a means to silence the piezo and record the subject's acknowledging the message on the display 51.

A display back light button 61 provides a low power illumination for the display 51.

Figure 3:
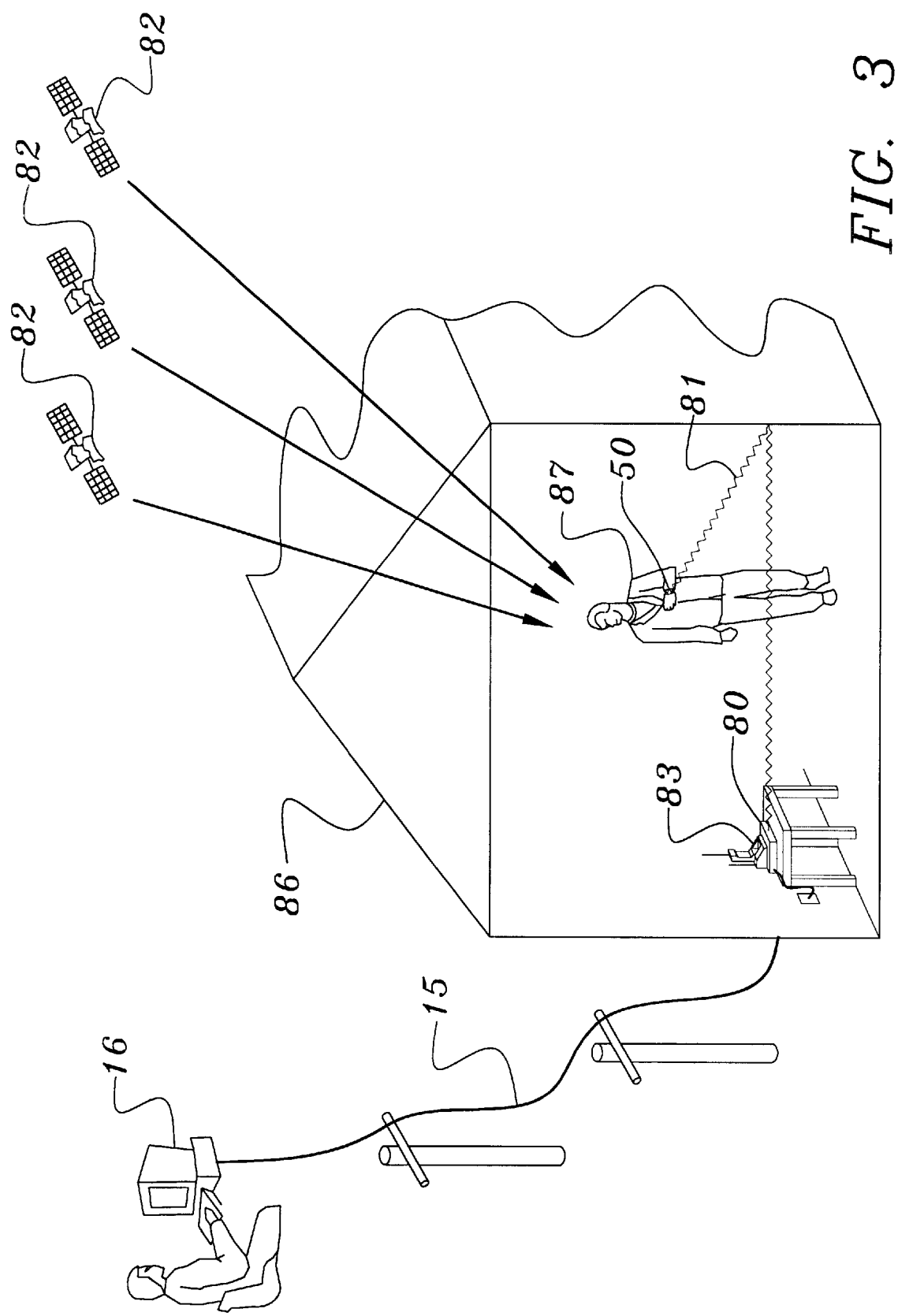
FIG. 3 is a figure describing the operation of the residence interface unit with the location recording device.

FIG. 3 describes the operation of the body worn LRD 50 with the residence interface unit (RIU) 80. The subject's location is derived by the LRD 50 determining its spatial coordinates using GPS satellites 82 or by its dead reckoning circuit 130. When the subject 87 is near a RIU, such as the subject's residence 86, a wireless infrared data link 81 transfers commands and data between the LRD 50 and RIU 80. Weatherproof RIUs 80 could also be placed strategically in the community as reporting stations to afford more frequent communications on a subject's 87 movements. The RIU is attached to a telephone 83 which can be either wire line 15 or wireless in order to communicate with the central data base 16.

Figure 4:
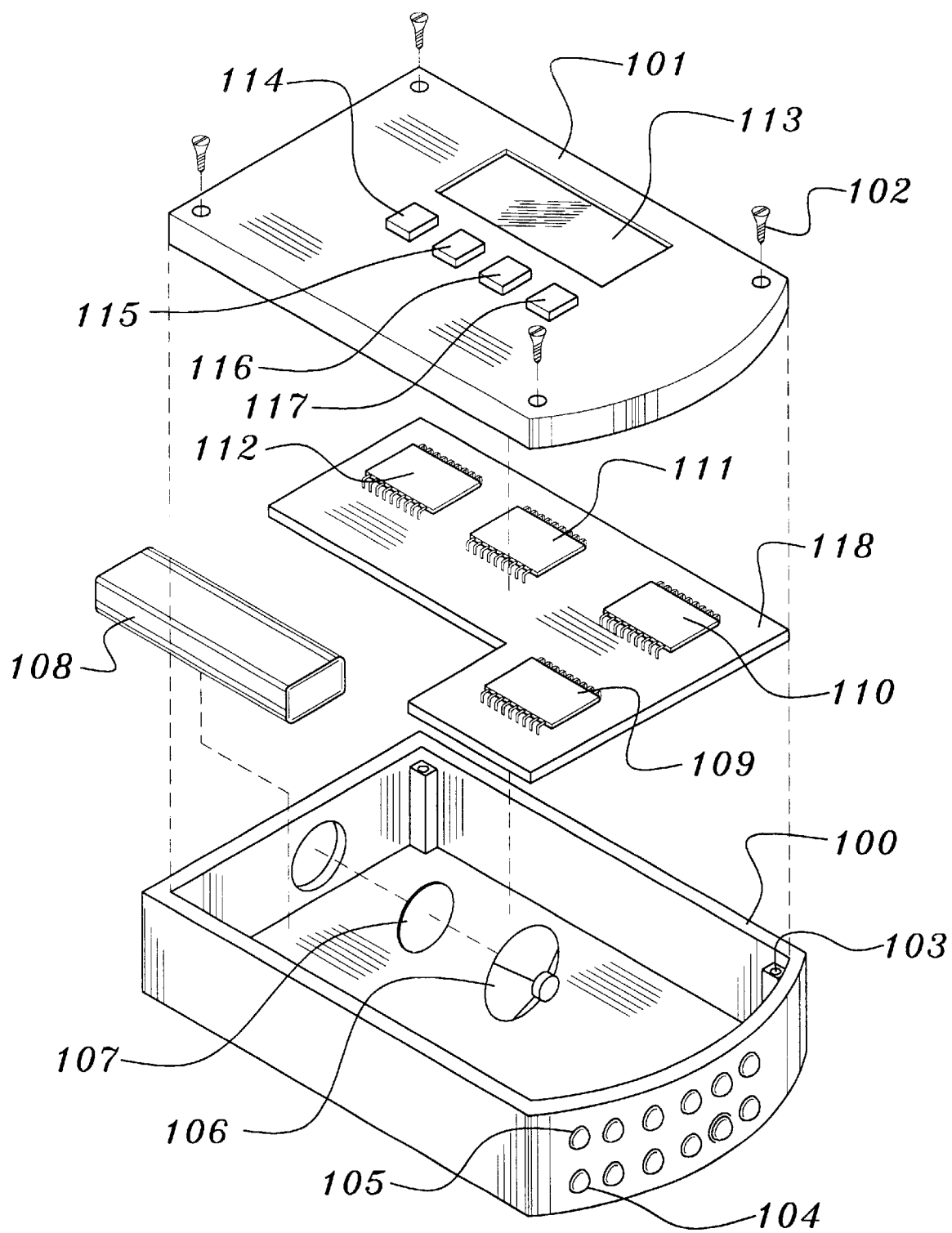
FIG. 4 is a figure describing the major subsystems comprising the residence interface unit for the location recording device.

FIG. 4 describes the major subsystems comprising the residence interface unit (RIU) 80. The RIU case 100 houses all the components and made from high impact plastic. The RIU cover 101 is attached using tamper resistant screws 102 as is known in the art. The tamper resistant screws 102 make or break a continuity tamper circuit in the RIU case 100 screw threads 103 when the tamper resistant screws 102 are tightened or loosened.

An infrared transmit diode array 104 allows the RIU 80 to send commands and data to the LRD 50. An infrared receive diode array 105 allows the RIU 80 to receive commands and data from the LRD 50. The arrays are arranged on a 180 degree curved surface to facilitate 1) continuous communications 81 with the LRD 50 while the subject 87 is moving in the room where the RIU 80 is located and 2) indirect communications 81 with the LRD 50 when the LRD 50 infrared diodes 53,54 cannot directly face the RIU 80 infrared diodes 104,105. Data modulated on the infrared beams can reflect off solid surfaces such as wall, floors and ceilings and effectively transfer data.

A speaker 106 for generating alert tones for the subject 87 is protected from damage by a speaker grill 107. The fine mesh of the speaker grill 107 also prevents insects from entering the RIU 80.

A large capacity rechargeable battery 108 provides power for the RIU 80 should external power fail for extended periods of time.

The RIU circuit board 118 contains the following major components;
1) Battery recharging circuit 109,
2) A field programmable gate array (FPGA as is known in the art) 110 which contains a processor, memory, serial I/O, discrete I/O and analog driver circuits;
3) A memory battery 111 to keep the RIU 80 program and data in the event that external power and the large capacity rechargeable battery 108 fail and
4) A telephone data modem 112 as is known in the art to transmit and receive commands and data between the RIU 80 and the central data base facility 16.

The RIU cover 101 contains a LCD message display 113 to provide instructions to the subject from the RIU 80 or the central data base facility 16. The RIU cover 101 also contains response push buttons so the subject can perform the following:
1) Acknowledge messages or questions with the yes button 114;
2) Respond with a negative answer with the no button 115;
3) Scroll backward through multiple messages or a large message with the scroll up 116 button or
4) Scroll forward through multiple messages or a large message with the scroll down 117 button.

Figure 5:
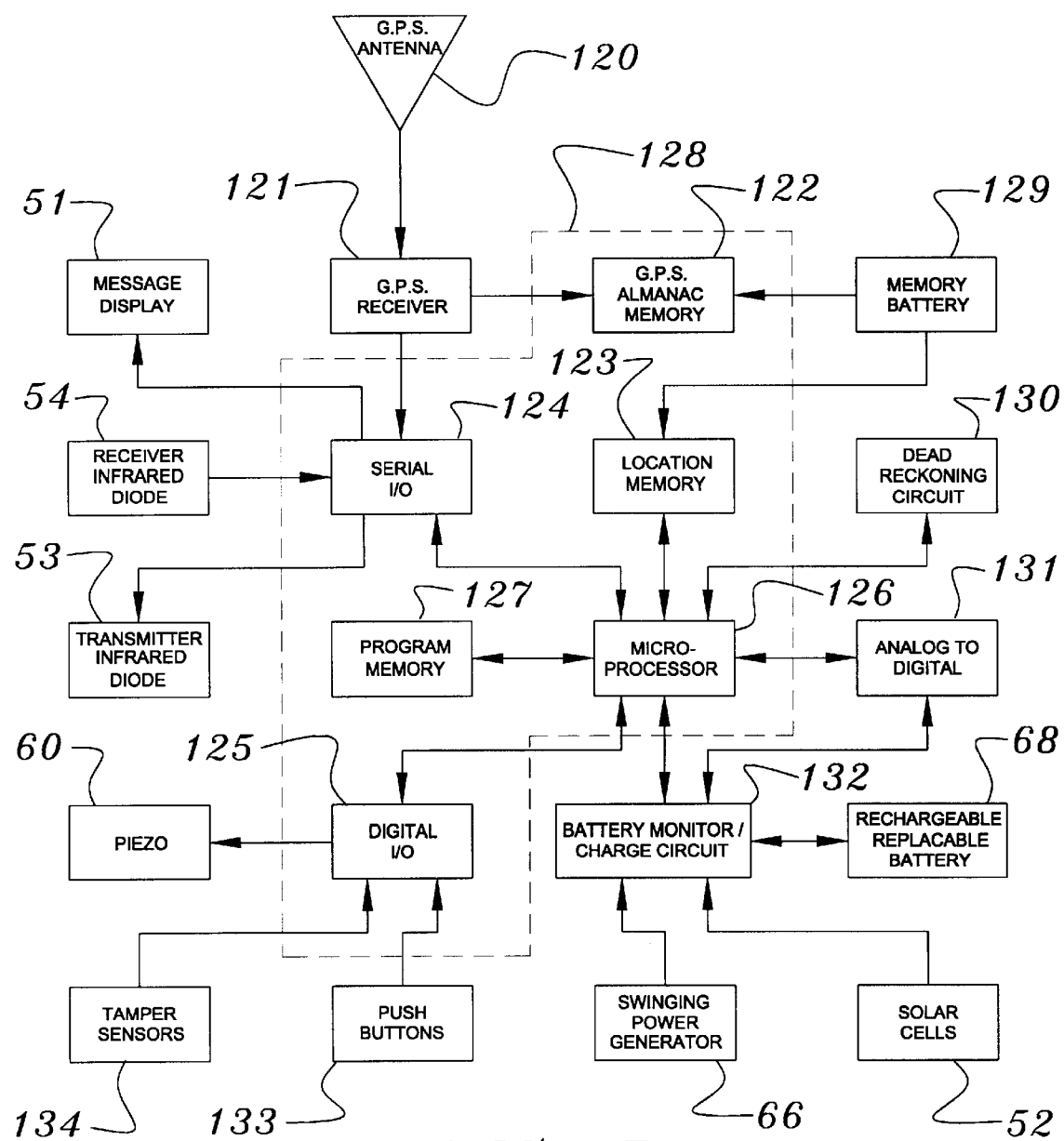
FIG. 5 is a functional block diagram of the location recording device.

FIG. 5 describes a functional block diagram of the body-worn LRD 50. The components of the LRD 50 provide the capability of a wrist-worn LRD 50 that will record locations of a subject 87 using GPS, dead reckon the location of a subject 87 during periods of denial of GPS while the subject 87 is walking, provides two-way infrared communications to transfer commands and data and incorporates tamper detection to prevent undetected removal of the LRD 50.

An active GPS high gain, low noise antenna 120 as is known in the art collects and amplifies GPS signals for the GPS receiver 121. A small, thin, transparent GPS antenna with an integrated low noise amplifier is described by U.S. Pat. Nos. 5,345,244 and 5,627,548 can be used as the watch display crystal and is incorporated herein by reference. The form factor of this antenna allows it to be placed on top of the LRD display 51 and solar cell array 52 without attenuating the light energy or increasing the thickness dimension of the body worn LRD 50.

A matched filtering GPS Receiver 121 implemented on a single DSP integrated circuit is described by U.S. Pat. No. 5,663,734 and incorporated herein by reference. This matched filtering GPS receiver incorporates the following power saving features; 1) Fast Fourier Transform (FFT) algorithms that are 10 to 100 times faster than traditional computational approaches, 2) DSP or FPGA single integrated circuit implementation, and 3) instant location fix upon power up of the radio frequency front end allowing the power down of the GPS receiver to achieve a typical less than 0.01% GPS receiver duty cycle or a two orders of magnitude reduction in power consumed by a conventional GPS receiver. A GPS radio frequency (RF) front end is implemented on a single integrated circuit (IC) as is known in the art and a single IC RF transceiver has been described in U.S. Pat. No. 4,438,491. A single RF front end is used for the matched filtering GPS receiver 121 cutting RF front end stand-by power in half and reducing the size and weight of the body-worn LRD 50.

A key requirement for the low power and quick operation of a matched filtering GPS receiver 121 is to have the GPS almanac data as is known in the art immediately available upon power-up of the GPS receiver 121. A GPS almanac memory 122 with a memory battery 129 allows the matched filtering GPS receiver 121 to provide a location within a second as opposed to minutes.

A dead reckoning circuit 130 described in U.S. Pat. No. 5,583,776 is employed to provide the capability to dead reckon the movements of the subject 87 when denial of GPS signals occurs and is incorporated herein by reference. Denial of GPS signals may occur when the subject 87 is inside multistory buildings or enters subterranean structures. Since the dead reckoning circuit 130 is based on body movement, the circuit is optimally suited for dead reckoning the subject 87 when there is denial of GPS signals when the subject 87 is walking. Since the error is 1% for distance traveled, the subject 87 can walk 10,000 feet with denial of GPS signals and still be located by dead reckoning within the accuracy of commercial GPS.

A field programmable gate array 128 (FPGA) as is known in the art is employed to integrate the major analog and digital components. The FPGA comprising a microprocessor 127, location memory 123, program memory 126, GPS almanac memory 122, serial I/O 124 and digital I/O 125 described in U.S. Pat. No. 5,731,757 assigned to XYLINX Corporation is included herein by reference. Prior to U.S. Pat. No. 5,773,993, the process of programming complex devices, such as a microprocessor, into a FPGA would have been cost and time prohibitive. The domain implementation described in to U.S. Pat. No. 5,773,993 allows programming a complex device into a FPGA by including a previously developed software library for the complex device as is known in the art. Today with a 500,000 gate XYLINX FPGA, the exact microprocessor, memory, serial I/O, digital I/O, analog to digital converters and associated glue logic chips, as is known in the art, of the processor board described in U.S. Pat. No. 5,731,757 can be implemented in a single FPGA. XYLINX has recently announced a 1,000,000 gate FPGA for late 1998. The power savings realized by implementing the body worn tracking device 1 digital and analog logic in an FPGA is 50% to 70% by known industry standards. This power savings is achieved by using gate level interconnects as opposed to chip level interconnects. Chip level interconnects are designed by the manufacturer for "worst case" loads and path length capacitance charging/discharging effects which results in high power interface gates for each connection on the chip.

The GPS almanac memory 122 and the location memory 123 are volatile memory as known in the art and are power backed-up by a memory battery 129. The program memory 126 is non-volatile programmable memory as known in the art and does not require a memory battery 129.

The serial I/O 124 interfaces the message display 51, infrared receiver diode 54, infrared transmitter diode 53 and the GPS receiver 121 to the micro processor 126. The digital I/O interfaces the pushbuttons 55,56,57,59,61, tamper sensors 62,70, and piezo 60 to the micro processor 126.

A transmit IR diode 53 and a receive IR diode 54 are incorporated in LRD 50 facing outward. The transmit IR diode 53 and a receive IR diode 54 are used for low power full duplex communications while the subject 87 is at a location, such as the subject's residence 86, where; 1) the body worn LRD 50 can download location history of the subject's 87 movements to the RIU 80, 2) the body worn LRD 50 can download any messages to be displayed to the subject on the RIU 80 and 3) the RIU 80 can upload any program or data updates from the central data base facility 16 to the body worn LRD 50. The transmit IR diode 53 and a receive IR diode 54 consume $\frac{1}{100}$th the power required for RF (i.e. cellular) full duplex communications with the central data base facility 16. This power saving method of infrared wireless data transfer is beneficial over traditional RF wireless methods.

The analog to digital circuit 131 converts analog voltage levels from the rechargeable/replaceable batteries 68, solar cell array 52, and swinging power generator 66 to digital data for the micro processor 126.

A battery charging circuit 132 described in U.S. Pat. No. 5,779,817 is specifically tailored for recharging a battery with solar cells and is incorporated herein by reference. This circuit transfers the optimum power and compensates for the charging profile of the battery when the battery charge is between 10% and 100% resulting in minimum power loss transfer from solar cells. An additional circuit described in U.S. Pat. No. 5,760,572 is employed in the battery charging circuit 132 to provide for optimum solar cell charging of a battery during intermittent loads without wasting power and is incorporated herein by reference. Such intermittent loads would occur when switching power loads on such as a GPS receiver.

The combination of; 1) dramatically lowering power consumption using power saving technology devices, 2) power saving cycling techniques, 3) improved power generating devices, 4) infrared low power wireless communications and 5) improved power transferring circuits for battery recharging make a LRD 50 operational for extended periods of time. Extended operational time is very significant if the subject 87 wearing the body-worn LRD 50 should not be responsible for the assured operation of the body-worn LRD. The extended time of operation permits the supervising agency to be responsible for battery replacement in the body-worn LRD 50 and also removes risks associated with connecting external power to the body-worn LRD 50 while being worn by the subject 87.

The combination of; 1) thin form factor solar cells, 2) a thin transparent GPS antenna, 3) a processor with memories, serial I/O and digital I/O on a FPGA chip, 4) matched filtering GPS receivers on an ASIC and DSP chip and 4) a GPS RF front-end on a single integrated circuit, 5) permit the body-worn LRD 50 to be packaged in a small wrist-worn form factor and be a lightweight device. The light weight and small form factor of the body-worn LRD 50 is very significant since there will be less interference with occupational duties and less fatigue for the subject 87 wearing the body-worn LRD 50.

The dead reckoning integrated circuit 130 allows subject 87 location recording while the subject 87 walks in buildings or subterranean structures where there is denial of GPS signals. The ability to track or record locations of a subject 87 while in a building or subterranean work environment is very significant since public safety is better assured while the offender 87 is allowed to have an occupation travel about the community but without anonymity.

Figure 6:
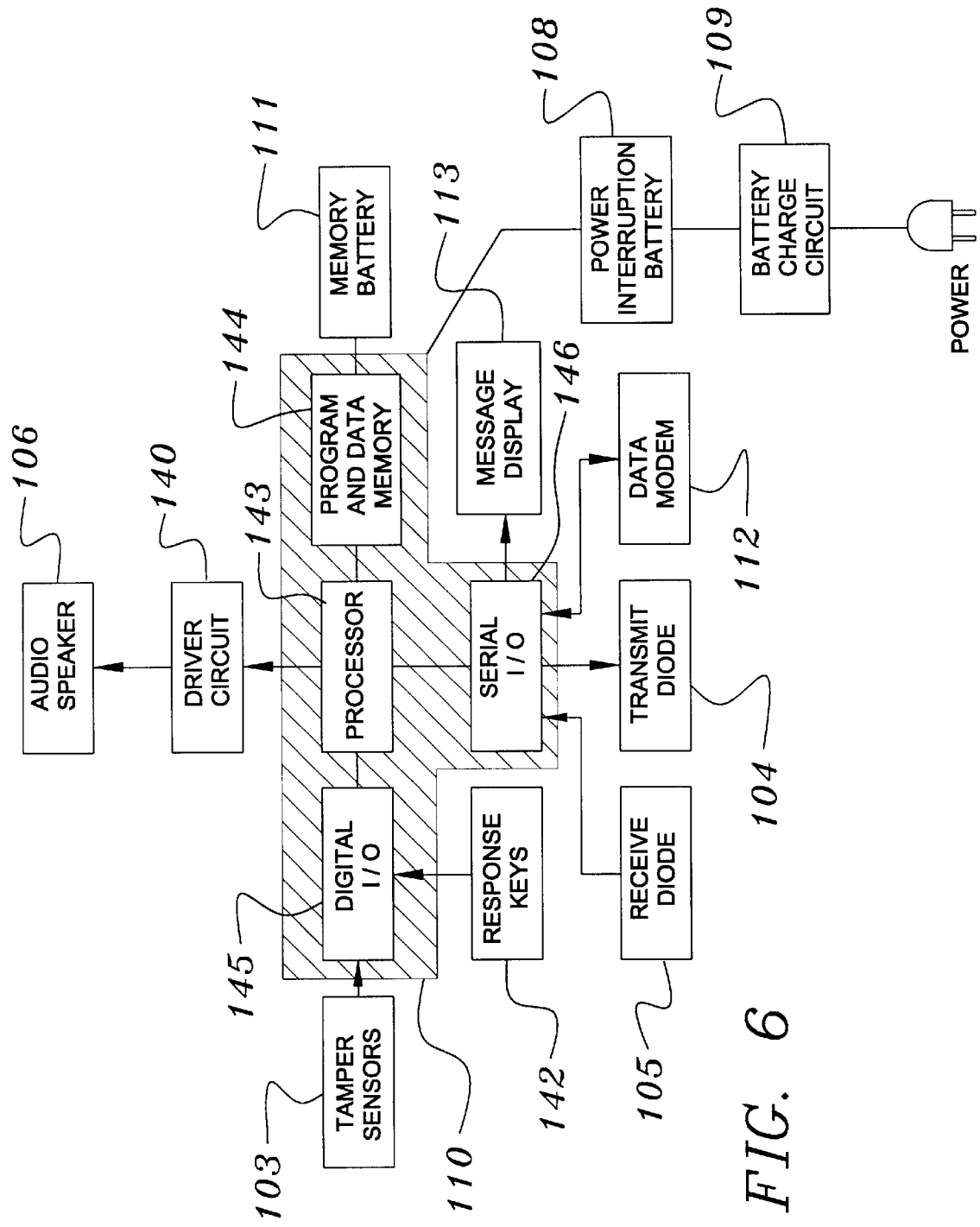
FIG. 6 is a functional block diagram of the residence interface unit.

FIG. 6 describes a functional block diagram of the RIU 80. The RIU 80 provides the LRD 50 a low power and low cost communications interface to the central data base facility 16 by using infrared communications with the LRD 50 and local phone access and/or the Internet to the central data base facility 16.

The receive infrared diode array 105 receives data from the LRD 50. The transmit infrared diode array 104 sends data to the LRD 50. The serial I/O 146 interfaces the transmit infrared diode array 104 and the receive infrared diode array 105 to the micro processor 143. The serial I/O 146 also interfaces the micro processor 143 to the data modem 112 as is known in the art to exchange commands and data between the RIU 80 and the central data base facility 16. The serial I/O interfaces the message display 113 to the micro processor 143.

The digital I/O 145 interfaces the RIU tamper sensors 103 to the micro processor 143. The digital I/O also interfaces the response buttons 144, 115, 116, 117 to the micro processor 143.

The battery charging circuit 109 recharges the large capacity power interruption battery 108. A memory battery 111 retains the program and data memory 144 should the power interruption battery 108 be depleted.

An audio driver circuit 140 as known in the art provides power for the audio speaker 106.

Figure 7:
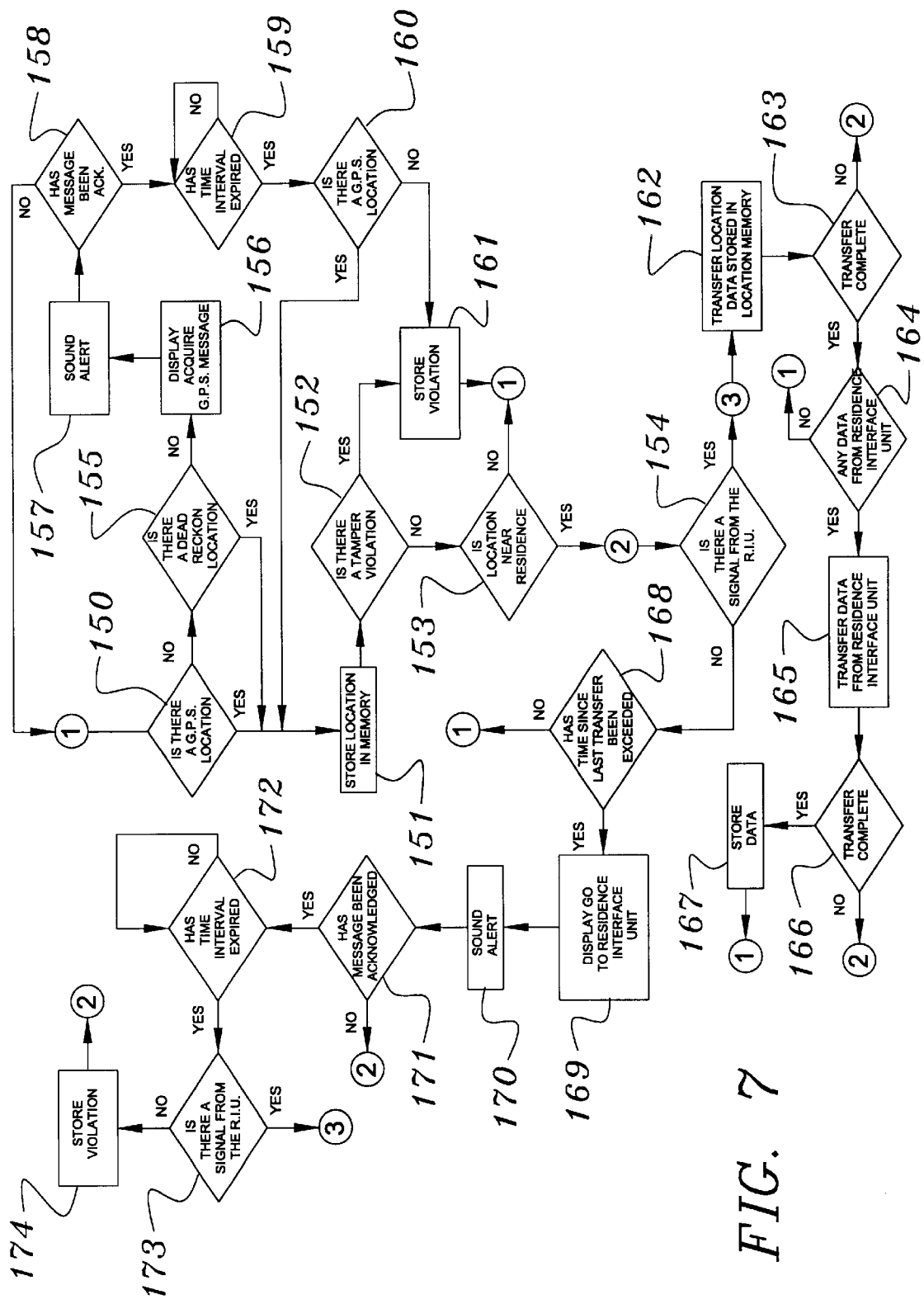
FIG. 7 is a flowchart of the method of operation for the location recording device.

FIG. 7 is a flowchart of the method of operation for the LRD 50. The LRD 50 determines its spatial location by processing GPS signals or by dead reckoning the walking movements of the subject 87. The LRD 50 stores location data until the data can be transferred to the RIU 80. The LRD 50 detects tamper conditions or conditions that affect LRD 50 performance and stores those conditions for subsequent data transfer to the RIU 80. The LRD 50 accepts commands and data from the RIU 80 and stores them in the appropriate LRD memory. The LRD 50 communicates with the subject 87 using an audible piezo notification and text messages. The LRD 50 performs these functions as an iterative process where the time interval for each iteration is programmable.

The LRD 50 activates the GPS receiver 121 and checks for a GPS location 150 (i.e. latitude and longitude). If there is a GPS location 150 then the time stamped location is stored 151 in the LRD location memory 123. If the GPS receiver 121 cannot determine a location then the dead reckoning circuit 130 is checked for a location 155. If the dead reckoning circuit 130 provides a location 155 then the time stamped location is stored 151 in the LRD location memory 123. If neither the GPS receiver 121 or the dead reckoning circuit 130 can determine a location, then the LRD 50 displays acquire GPS 156 on the LRD message display 51. The LRD 50 then activates the piezo 60 audible alert 157. The LRD 50 then checks to see if the piezo acknowledged button 59 has been pressed 158. If the piezo acknowledged button 59 has not been pressed 158, the LRD 50 activates the GPS receiver 121 to obtain a location 150. If the piezo acknowledged button 59 has been pressed 158, then the LRD 50 waits for a programmable interval 159 before activating the GPS receiver 121 to obtain a location 160. If the GPS receiver 121 provides a location 160, then the time stamped location is stored 151 in the LRD location memory 123. If after notifying the subject to acquire GPS 156,157 and waiting for the programmed time interval 159 there is still no GPS location 160, the violation is stored 161 in the LRD location memory 123.

After storing a location 151 in the LRD location memory 123, the LRD checks to see if there have been any tampers detected 152. These tampers can be hard tampers such as; 1) the removal of the LRD 50 by opening the adjustable strap hasp 65 or severing the strap and breaking the strap continuity circuit 62 or 2) loosening the waterproof battery cover 69. The tampers could be soft tampers such as not replacing the batteries 68 when notified on the message display 51. If there are any tamper violations, they are stored 161 on the LRD location memory 123.

If there are locations stored 151 in the LRD location memory 123, the LRD 50 checks to see if the current location is near the subject's residence 153. If the LRD 50 is not near the subject's residence 153, then the LRD 50 continues to record locations 150. If the LRD 50 is near the subject's residence 153, then the LRD 50 listens for an infrared signal from the RIU 154. If a signal from the RIU 80 is detected 154, then the LRD 50 transfers 162 the data stored in the LRD location memory 123. If the data transfer from LRD 50 to RIU 80 is not completed 163, the LRD 50 looks for a signal 154 from the RIU 80. If the LRD 50 finds the RIU signal again, data transfer is started again 162. If the LRD 50 cannot find a signal form the RIU 154, the LRD 50 checks to see if the set time since the last data transfer has expired 168. If the time since the last data transfer has not expired 168, then the LRD 50 continues to store locations 150.

If the time since the last data transfer has expired 168, the LRD 50 displays a go to residence interface unit message 169 on the LRD display 51. The LRD 50 then activates the piezo 60 audible alert 170. The LRD 50 then checks to see if the piezo acknowledged button 59 has been pressed 171. If the piezo acknowledged button 59 has not been pressed 171, the LRD 50 checks to see if there is a signal 154 from the RIU 80. If the piezo acknowledged button 59 has been pressed 171, then the LRD 50 waits for a programmable interval 172 before checking to see if there is a signal 173 from the RIU 80. If there is a signal 173 from the RIU 80, then the LRD 50 transfers data 162 to the RIU 80. If after notifying the subject to go to the RIU 169 and waiting for the programmed time interval 172 there is still no signal 173 from the RIU 80, the violation is stored 174 in the LRD location memory 123 and the LRD 50 continues to listen for a signal 154 from the RIU 80.

After the LRD 50 transfers data 163 to the RIU 80, the LRD 50 checks to see if there is any data from 164 the RIU 80. If there is no data to be transferred from 164 the RIU 80, the LRD 50 continues to store locations 150. If there is data to be transferred from 164 the RIU 80, the LRD 50 transfers the data 165. The LRD 50 checks to see if the data transfer from the RIU 80 is complete 166. If the data transfer is complete 166, then the LRD 50 stores the data 167 in the appropriate LRD memories 123,127. If the data transfer is not complete 166, the LRD 50 will listen for a signal 154 from the RIU 80.

Figure 8A:
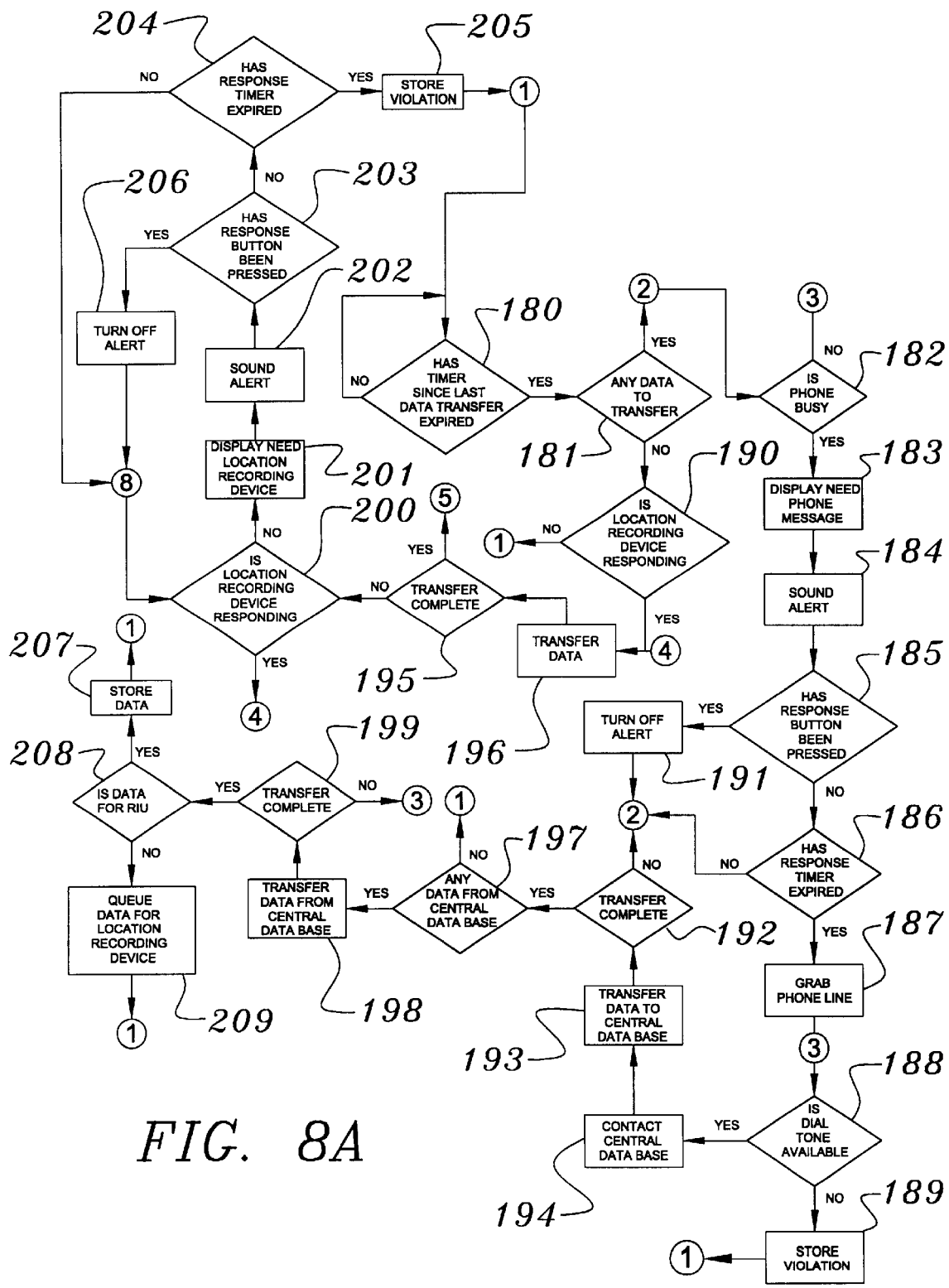
FIG. 8 is a flowchart of the method of operation for the residence interface unit.
Figure 8B:
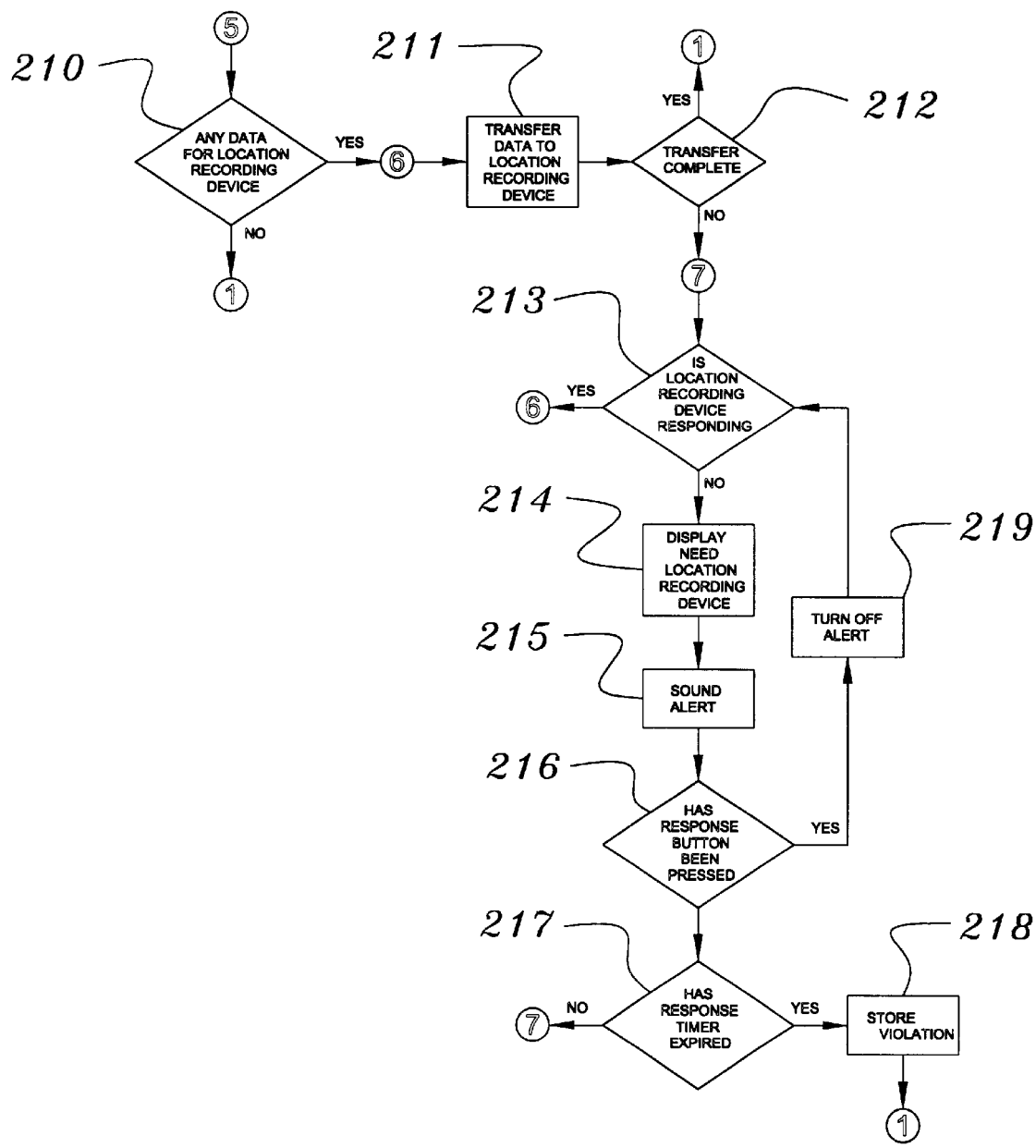

FIG. 8 is a flowchart of the method of operation for the RIU 80. The RIU collects data from the LRD 50 and forwards that data to the central data base facility 16. The RIU 80 stores commands and data from the central data base facility 16. The commands and data from the central data base facility 16 can be program updates and data variable updates for either the RIU 80 or the LRD 50. The RIU 80 will transfer any commands and data to the LRD 50. The RIU 80 checks for tampers such as removing the RIU cover 101, unplugging the residence phone line 15 or failing to respond to command messages on the RIU message display 113. The RIU 80 performs these functions as an iterative process where the time interval for each iteration is programmable.

The RIU 80 checks to see if the time interval since the last data transfer 180 between the RIU 80 and the central data base facility 16 has expired. If the time interval has expired 180 then the RIU 80 checks to see if there is any LRD 50 data or RIU 80 data stored in the RIU memory 144 to transfer 181. If the RIU 80 has LRD 50 data stored in its memory 144 to be transferred 181, then the RIU 80 checks to see if the phone line 15 is busy 182. If the phone line 15 is not busy 182, then the RIU 80 checks for a dial tone 188. If there is no dial tone 188, the RIU 80 stores a violation that the phone line 15 is out of order. If the dial tone is available 188, the RIU 80 contacts 194 the central data base facility 16. The RIU 80 transfers the stored data 193 to the central data base facility 16. The RIU 80 then checks to see if the data transfer completed 192. If the data transfer did not complete 192 then the RIU 80 checks to see if the phone line 15 is busy 182. If the data transfer completed 192, then the RIU 80 checks to see if is any data from 197 the central data base facility 16. If the central data base facility 16 has data to send 197, the RIU 80 transfers the data 198 and checks to see if the transfer completed 199. If the transfer did not complete 199, the RIU 80 checks for a dial tone 188. If the data transfer completed 199, the RIU checks for data 208 that is for the RIU 80 and/or the LRD 50. If the data 208 is for the RIU 80, then the RIU 80 stores the data 207 in the RIU memory 144. If the transferred data 208 is for the LRD 50, then the RIU 80 queues the data 209 for the next data transmission to the LRD 50.

If the RIU 80 finds that the phone line 15 is busy 182, then the RIU 80 displays that it needs the phone line 183 on the RIU display 113 and activates alert tones 184 on the RIU speaker 106. The RIU 80 then checks to see if the RIU yes response button 114 has been pressed 185. If the RIU yes response button 114 has been pressed 185 the RIU 80 deactivates the alert tones 191 and checks to see if the phone line 15 is busy 182. If the RIU yes response button 114 has not been pressed 185 the RIU 80 checks to see if the response time interval has expired 186. If the response time interval has not expired 186 the RIU 80 checks to see if the phone line 15 is busy 182. If the response time interval has expired 186 the RIU 80 grabs 187 the phone line 15.

If the time since the last data transfer to the central data base facility 16 has expired 180 and there is no LRD 50 data to transfer 181 to the central data base facility 16, the RIU 80 will transmit a beacon signal and check if the LRD 50 is responding 190. The RIU 80 will continue to transmit a beacon signal until there is a response 190 from the LRD 50. If there is a response 190 from the LRD 50 then the RIU transfers the data 196 from the LRD 50. The RIU 80 checks if the data transfer from the LRD 50 completed 195. If data transfer is not complete 195 the RIU 80 transmits a beacon signal to see if the LRD 50 responds 200. If the LRD 50 responds 200 the RIU 80 transfers the data 196 from the LRD 50. If the LRD 50 does not respond 200 the RIU 80 displays need the location recording device 201 on the RIU display 113 and activates alert tones 202 on the RIU speaker 106. The RIU 80 then checks to see if the RIU yes response button 114 has been pressed 203. If the RIU yes response button 114 has been pressed 203 the RIU 80 deactivates the alert tones 206 and checks to see if the LRD 50 is responding 200. If the RIU yes response button 114 has not been pressed 203 the RIU 80 checks to see if the response time interval has expired 204. If the response time interval has not expired 204 the RIU 80 checks to see if the LRD 50 is responding 200. If the response time interval has expired 204 the RIU 80 stores the violation 205 and checks if the time since the last data transfer to the central data base facility 16 has expired 180.

If the data transfer from the LRD 50 completed 195 the RIU 80 checks if there is data queued 210 for the LRD 50. If there is data queued 210 for the LRD 50 the RIU 80 transfers the data 211 to the LRD 50. The RIU 80 checks for data transfer complete 212. If data transfer is not complete 212 the RIU 80 transmits a beacon signal to see if the LRD 50 responds 213. If the LRD 50 responds 213 the RIU 80 transfers the data 211 from the LRD 50. If the LRD 50 does not respond 213 the RIU 80 displays need the location recording device 214 on the RIU display 113 and activates alert tones 215 on the RIU speaker 106. The RIU 80 then checks to see if the RIU yes response button 114 has been pressed 216. If the RIU yes response button 114 has been pressed 216 the RIU 80 deactivates the alert tones 219 and checks to see if the LRD 50 is responding 213. If the RIU yes response button 114 has not been pressed 216 the RIU 80 checks to see if the response time interval has expired 217. If the response time interval has not expired 186 the RIU 80 checks to see if the LRD 50 is responding 213. If the response time interval has expired 186 the RIU 80 stores the violation 218 and checks if the time since the last data transfer to the central data base facility 16 has expired 180.

Figure 9A:
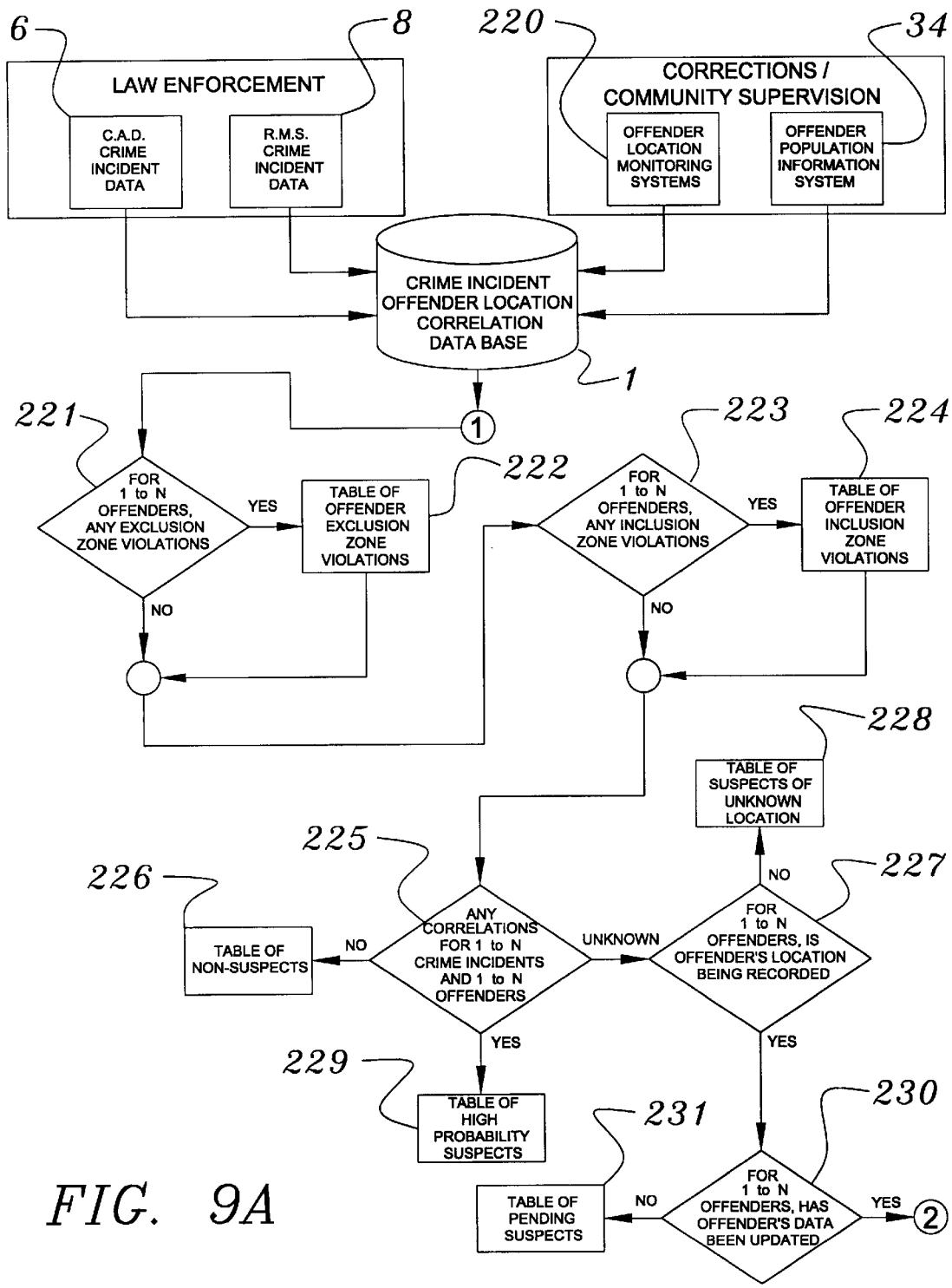
FIG. 9 is a flowchart of the method of operation for the automated crime incident/subject location correlation.
Figure 9B:
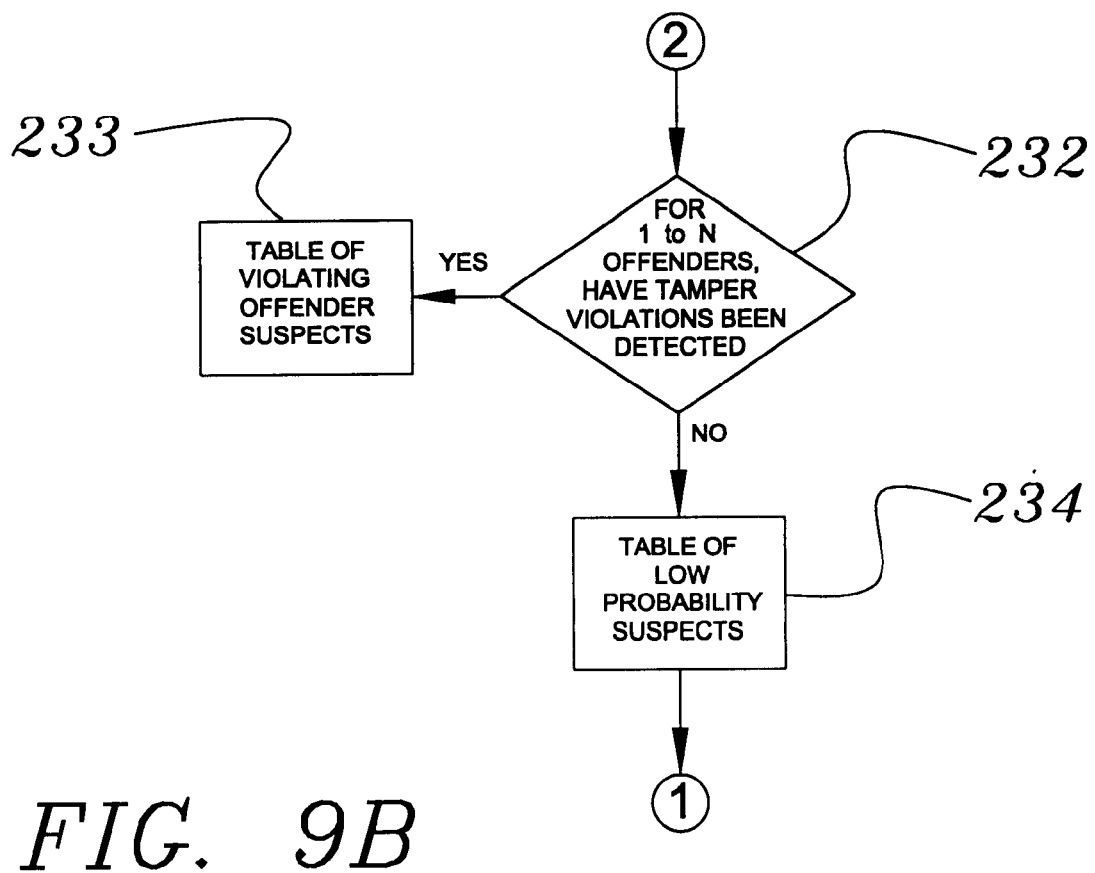

FIG. 9 is a flowchart of the method of operation for the automated crime incident/subject location correlation. The automated crime incident/subject location correlation is a continuous process that reports either electronically to a query terminal 37,39 or by hardcopy fax or printout to either law enforcement or corrections/community supervision when a crime incident 2 is correlated with a subject's location 3.

The crime incident offender location correlation data base 1 is a real-time system that is continuously updated from;
  1) Law enforcement CAD systems 6 that provide crime incident data,
  2) Law enforcement RMS systems 8 that provide crime incident data,
  3) Corrections/community supervision offender location monitoring systems 220,
  4) Corrections/community supervision offender population information systems 34.

The updates can either be submitted in batch mode as known in the art or real-time as known in the art. Batch mode submittals, also known in the art as synchronous since they are synchronized with times of day or number of submittals per day, determine when automated correlation can occur since batch mode submittal will occur after the event (either crime incident or offender location recording) has taken place. Real-time submittals, also known in the art as asynchronous since they occur immediately with no predetermined scheduling, determine the need for tables of pending correlation since real-time submittal will occur as the event (either crime incident or offender location recording) is taking place.

CAD crime incident data 6 typically contains the following dispatch information;
  1) Dispatched officer(s) identification,
  2) Date/time of dispatch,
  3) Location of incident,
  4) Incident identifier,
  5) Type of incident code and
  6) Ancillary information RMS crime incident data 8 typically contains the following investigative information;
  1) Information from CAD systems (if a dispatch was involved),
  2) Incident identification code,
  3) Investigating officer(s) identification,
  4) Subsequent time/date/location information,
  5) Additional incident(s) information and
  6) Motus opperandi (criminal methods).

Offender location monitoring systems 220 is a collection of methods of locating offenders;
  1) House arrest location monitoring systems 10 as is known in the art,
  2) Location recording using GPS 14 as described in this invention,
  3) Continuous location recording using GPS 18 as is known in the art, 4) Continuous location recording using RF triangulation 22 as is known in the art,
5) Voice recognition/caller identification location recording 26 as is known in the art and
6) Mobile cellular triangulation location recording 30 as is known in the art.

Offender location monitoring systems 220 typically contain the following information;
1) Offender identification
2) Date, time and location of an offender (random to continuous),
3) Type of offender violations with date and time,
4) Offender's corrections/community supervision officer(s) and
5) Offender violation contact list(s) and response(s).

Offender population information systems 34 typically contains the following information regarding the offender population under community supervision;
1) Offender demographic data,
2) Offender criminal history,
3) Offender personal information,
4) Offender employment information,
5) Offender education information,
6) Offender sentencing information,
7) Digitized images and
8) Associated victim information.

None of the data from the sources described above is standardized, therefore the crime incident offender location correlation data base 1 must translate data types and formats to a standard internal data type and format, as known in the art, as it receives data (either by extraction or import as known in the art) from each unique system. The crime incident offender location correlation data base 1 must also translate from its internal standard data type and format to each law enforcement and corrections/community supervision agency's unique representation of data as it generates either electronic or hardcopy reports.

The automated crime incident/subject location correlation is an iterative process that continuously performs correlation as data from CAD 7, RMS 9, IMS 34 and offender location monitoring systems 220 is received by the crime incident offender location correlation data base 1. Each offender's data from an offender location monitoring system 220 is correlated against any violations of exclusion zone criteria 221 from offender sentencing data in IMS 34 and exclusion zone violations reported by the offender location monitoring system 220. If exclusion zone violations are correlated 221 a table report is generated 222 for the law enforcement and/or corrections/community supervision agency(s). Each offender's data from an offender location monitoring system 220 is correlated against any violations of inclusion zone criteria 223 from offender sentencing data in IMS 34 and inclusion zone violations reported by the offender location monitoring system 220. If inclusion zone violations are correlated 223 a table report is generated 224 for the law enforcement and/or corrections/community supervision agency(s).

Each offender's data from an offender location monitoring system 220 is correlated against any crime incidents 225 from CAD 6 and RMS 8 systems. For offender locations that were outside the crime incident automated criteria boundaries, a table report of non-suspects is generated 226. For offender locations that were inside the crime incident automated criteria boundaries, a table report of high probability suspects is generated 229. For offenders whose location is unknown 225, those offenders are correlated to see if those offender's locations are being recorded 227 by a location monitoring system 220. For those offenders whose locations are not being monitored 227 at the time of the crime incident, a table report of offender suspects of unknown location is generated 228. For the offenders whose locations are being monitored 227, those offenders are correlated to see if location data has been updated 230 for those offenders for the time of the crime incident. For those offenders whose location data has not been updated 230 for the time of the crime incident, a table report of pending offender suspects 231 is generated. For those offenders whose location data has been updated 230 for the time of the crime incident but no location data is available, those offenders are correlated to see if the offender was intentionally violating by tampering 232 (i.e. not replacing/recharging batteries, not calling in, removing body-worn devices, etc.). For those offenders with tamper violations at the time of the crime incident, a table report of tamper violation offender suspects 223 is generated. For those offenders whose location data has been updated 230 for the time of the crime incident but no location data is available and no tamper violations were recorded 232 (i.e. equipment malfunction, between sample intervals for voice recognition/caller identification, etc.), a table report of low probability offender suspects 234 is generated.

FIGS. 10 through 19 are flowcharts of the method of operation for structured queries submitted against the crime incident offender location correlation data base 1. Structured queries support investigative crime incident/offender location correlation with variable criteria since automated crime incident/offender location correlation described in FIG. 9 must deal with finite criteria established at the time the automated correlation is generated. Subsequent investigative data may require changing one or more of the automated correlation criteria to support a broader investigative query due to discovery of additional crime incident data not available at the time when the automated correlation report for the crime incident was generated. Law enforcement and corrections/community supervision agency personnel use the query terminal 37,39 for structured queries and are hereinafter referred to as users.

Figure 10A:
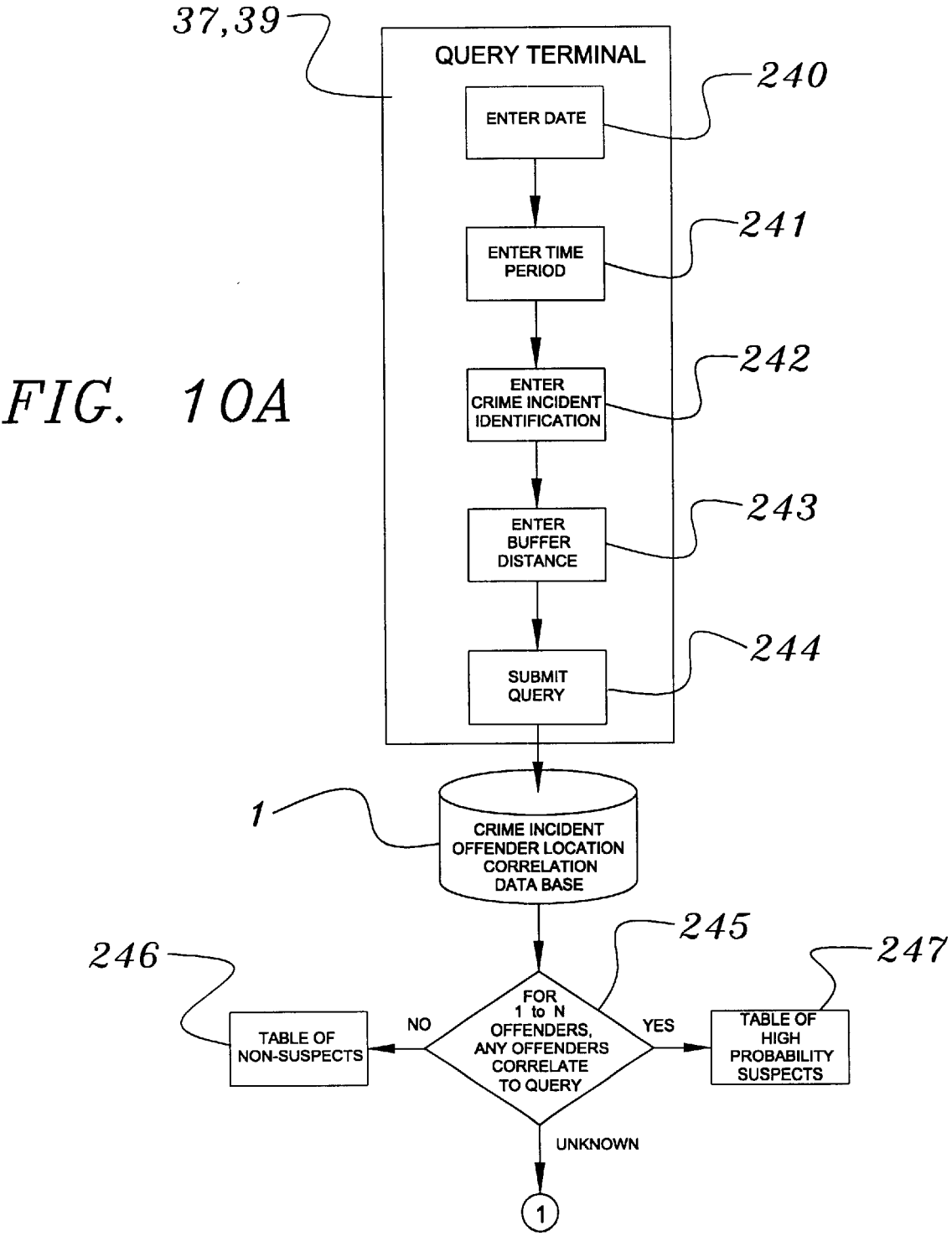
FIG. 10 is a flowchart of the method of operation for the query terminal correlating a single crime incident with a subject's location.
Figure 10B:
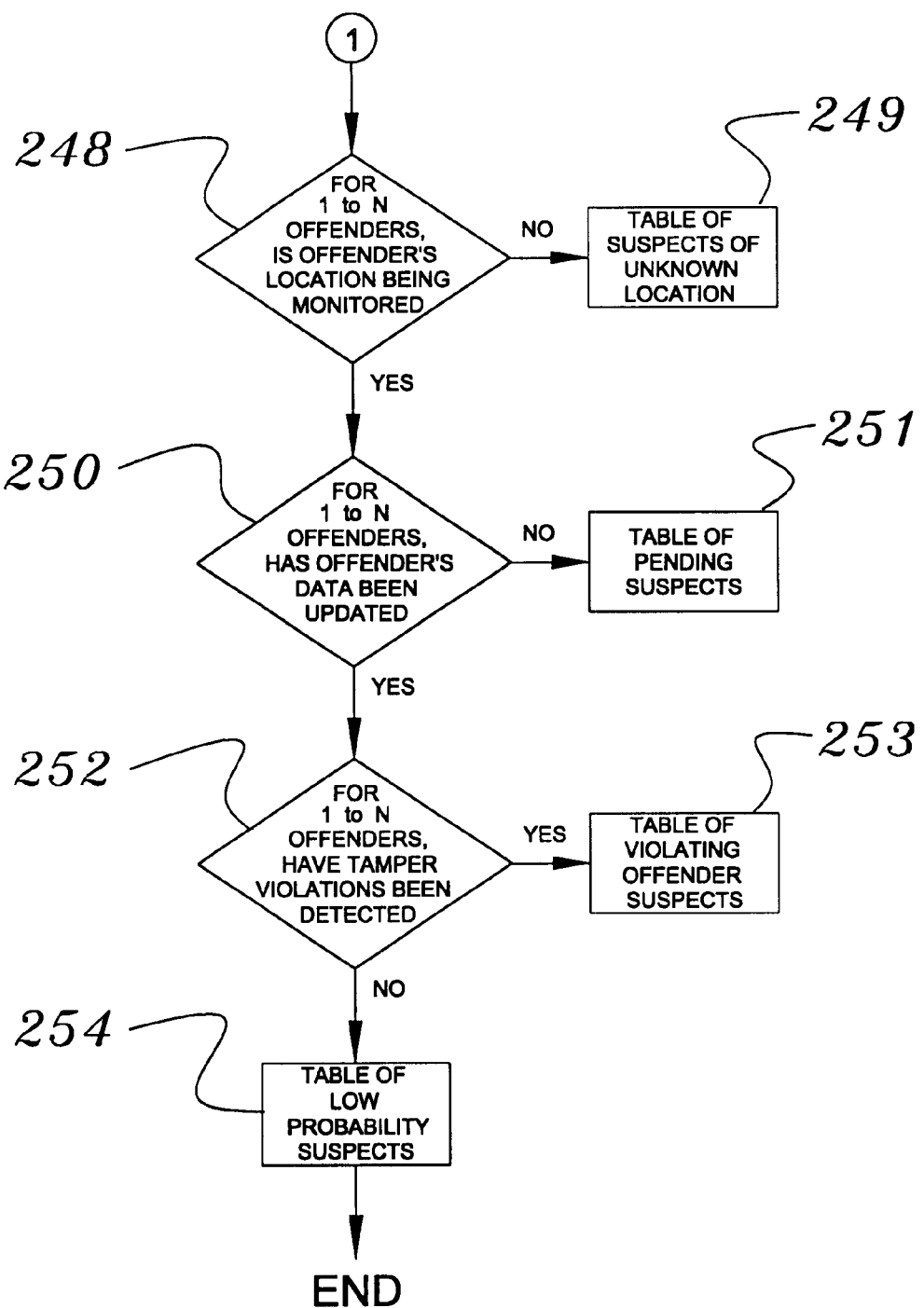

FIG. 10 is a flowchart of the method of operation for the query terminal 37,39 correlating a single crime incident with offender(s) locations based on the following criteria;
1) Date or range of dates (ie. spanning midnight, time of crime incident could have occurred in a multiple day interval, etc.),
2) Time period (i.e. the exact time covers multiple hours),
3) Specific crime incident identification and
4) Buffer distance around crime incident location (i.e. increased buffer area due to time period, offender's travel speed, etc.).

The user is prompted for a date or range of dates 240. No date entry assumes all dates. The user is prompted for a time period 241. No time period entry assumes 24 hours for the date or range of dates. The user is prompted for a crime incident identification 242. The user is prompted for a buffer distance 243 around the crime incident location. The user submits the structured query 244 to the crime incident offender location correlation data base 1.

Each offender's data from an offender location monitoring system 220 is correlated against the structured crime incident query criteria 245. For those offenders that have location data that does not match the structured crime incident query criteria 245, a table report of non-suspect offenders is generated 246. For those offenders that have location data that does match the structured crime incident query criteria 245, a table report of high suspect offenders is generated 247.

For offenders whose location is unknown during the date and or time for structured crime incident query criteria 245, those offenders are correlated to see if those offender's locations are being recorded 248 by a location monitoring system 220. For those offenders whose locations are not being monitored during the date and or time for structured crime incident query criteria 245, a table report of offender suspects of unknown location is generated 249. For the offenders whose locations are being monitored 248 during the date and or time for the structured crime incident query criteria 245, those offenders are correlated to see if location data has been updated 250 for those offenders for the time of the crime incident. For those offenders whose location data has not been updated 250 for the time during the structured crime incident query criteria 245, a table report of pending offender suspects 251 is generated. For those offenders whose location data has been updated 250 for the time during the structured crime incident query criteria 245 but no location data is available, those offenders are correlated to see if the offender was intentionally violating by tampering 252 (i.e. not replacing/recharging batteries, not calling in, removing body-worn devices, etc.). For those offenders with tamper violations 252 at the time during the structured crime incident query criteria 245, a table report of tamper violation offender suspects 253 is generated. For those offenders whose location data has been updated 250 for the time during the structured crime incident query criteria 245 but no location data is available and no tamper violations were recorded 252 (i.e. equipment malfunction, between sample intervals for voice recognition/caller identification, etc.), a table report of low probability offender suspects 254 is generated.

Figure 11A:
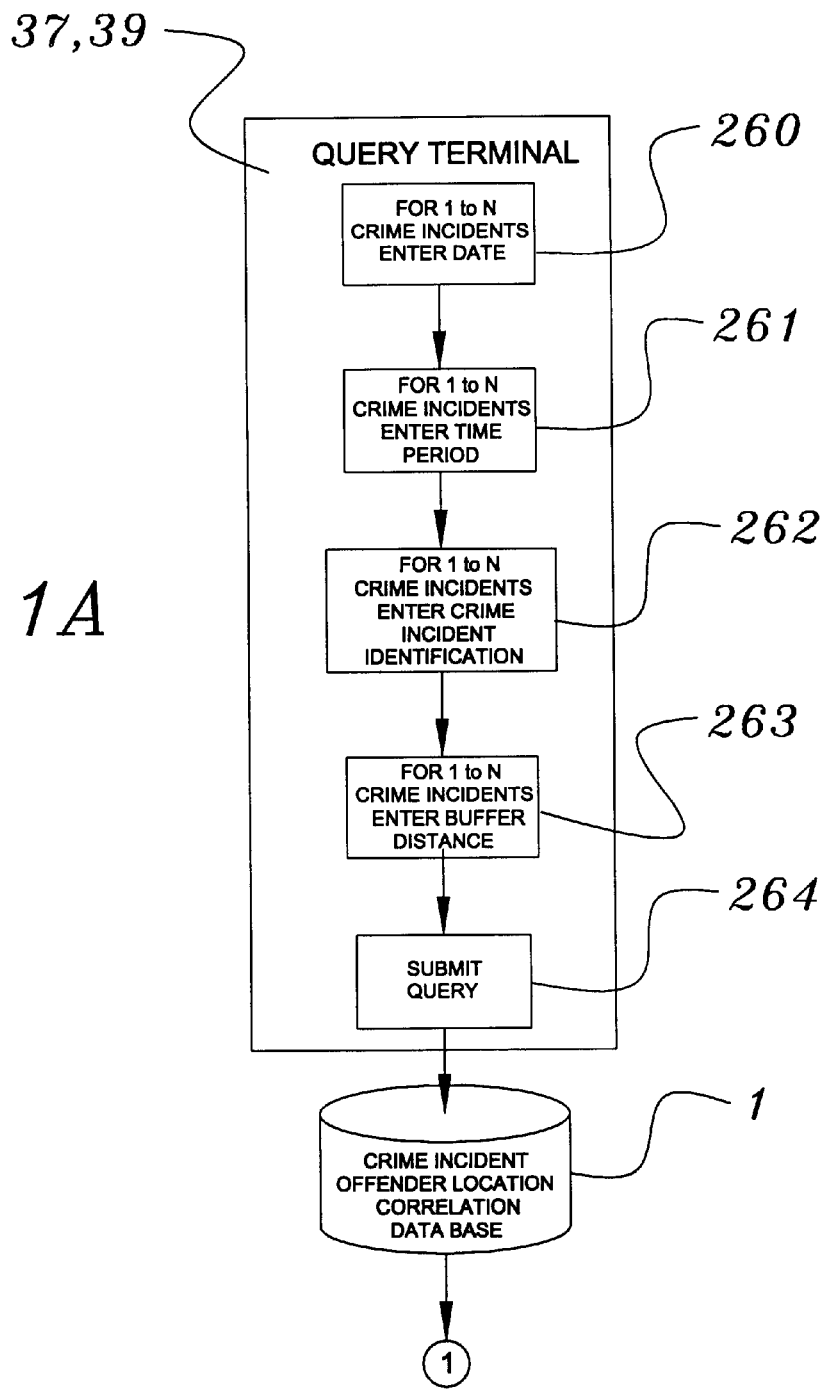
FIG. 11 is a flowchart of the method of operation for the query terminal correlating multiple crime incidents with multiple subject's location.
Figure 11B:
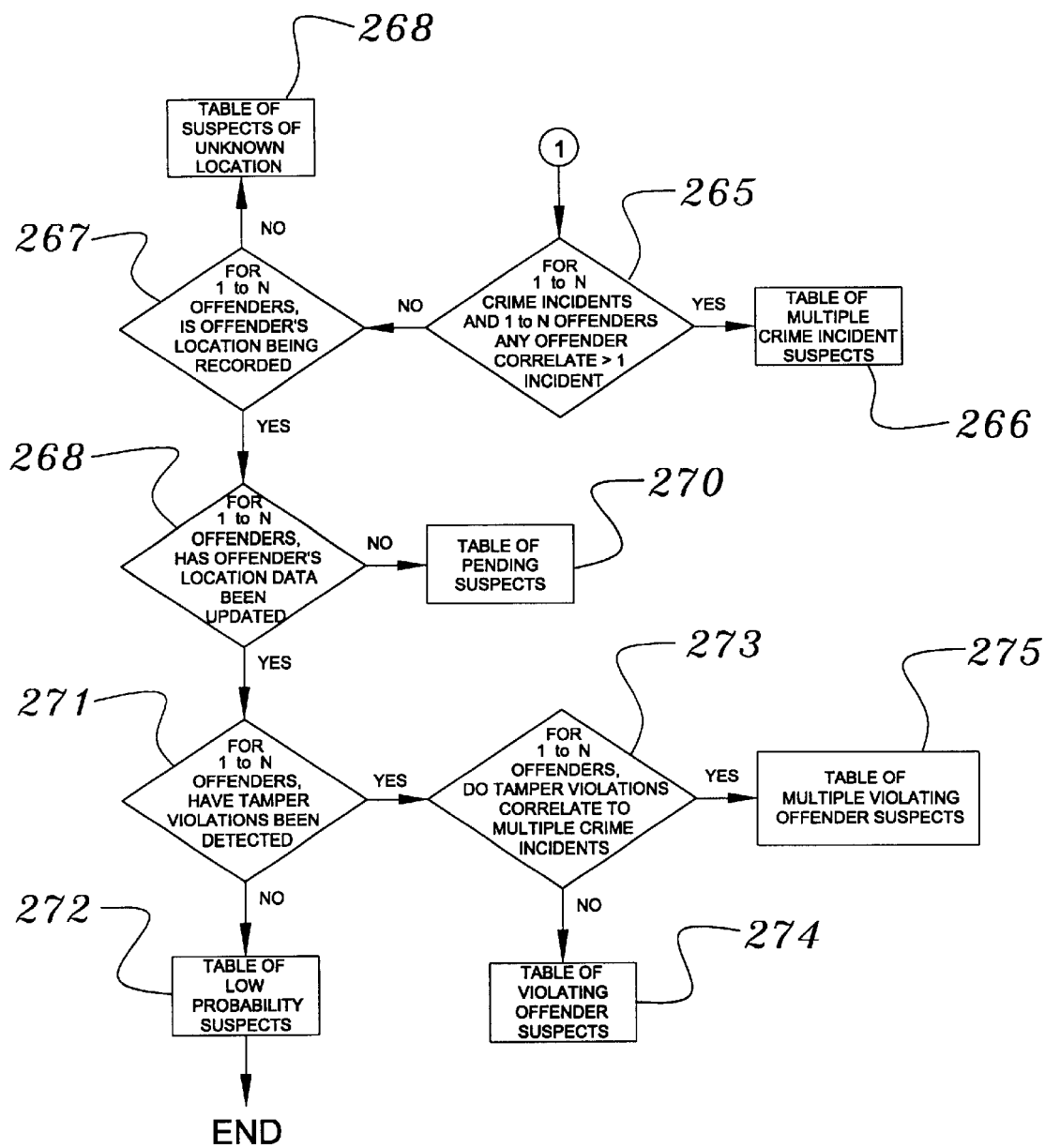

FIG. 11 is a flowchart of the method of operation for the query terminal 37,39 correlating multiple crime incidents with offender(s) locations based on the following criteria;

1) For each crime incident, a date or range of dates (ie. spanning midnight, time of crime incident could have occurred in a multiple day interval, etc.),
2) For each crime incident, a time period (i.e. the exact time covers multiple hours),
3) For each crime incident, a specific crime incident identification and
4) For each crime incident, a buffer distance around crime incident location (i.e. increased buffer area due to time period, offender's travel speed, etc.).

The user is prompted for a date or range of dates 260 for each crime incident. No date entry assumes all dates. The user is prompted for a time period 261 for each crime incident. No time period entry assumes 24 hours for the date or range of dates. The user is prompted for each crime incident identification262. The user is prompted for a buffer distance 263 around the crime incident location. The user submits the structured query 264 to the crime incident offender location correlation data base 1.

Each offender's data from an offender location monitoring system 220 is correlated against the structured multiple crime incident query criteria 265. For those offenders that have location data that does match more than one structured crime incident query criteria 265, a table report of multiple crime incident suspect offenders is generated 266.

For offenders whose location does not correlate with more than one crime incident query criteria 265, those offenders are correlated to see if those offender's locations are being recorded 267 by a location monitoring system 220. For those offenders whose locations are not being monitored during the date and or time for structured multiple crime incident query criteria 265, a table report of offender suspects of unknown location is generated 268. For the offenders whose locations are being monitored 267 during the date and or time for the structured crime incident query criteria 245, those offenders are correlated to see if location data has been updated 269 for those offenders for the time of multiple crime incidents. For those offenders whose location data has not been updated 269 for the time during the structured multiple crime incident query criteria 265, a table report of pending offender suspects 270 is generated. For those offenders whose location data has been updated 269 for the time during the structured multiple crime incident query criteria 245 but no location data is available, those offenders are correlated to see if the offender was intentionally violating by tampering 271 (i.e. not replacing/recharging batteries, not calling in, removing body-worn devices, etc.). For those offenders with tamper violations 273 for multiple crime incidents, a table report of tamper violation offender suspects correlating to multiple crime incidents 275 is generated. For those offenders whose location data has been updated 269 for the time during the structured multiple crime incident query criteria 265 but no location data is available and no tamper violations were recorded 271 (i.e. equipment malfunction, between sample intervals for voice recognition/caller identification, etc.), a table report of low probability offender suspects 272 is generated. For those offenders with tamper violations at the time of one crime incident query criteria but not for multiple crime incidents 273, a table report of violating offender suspects is generated for each crime incident 274.

Figure 12:
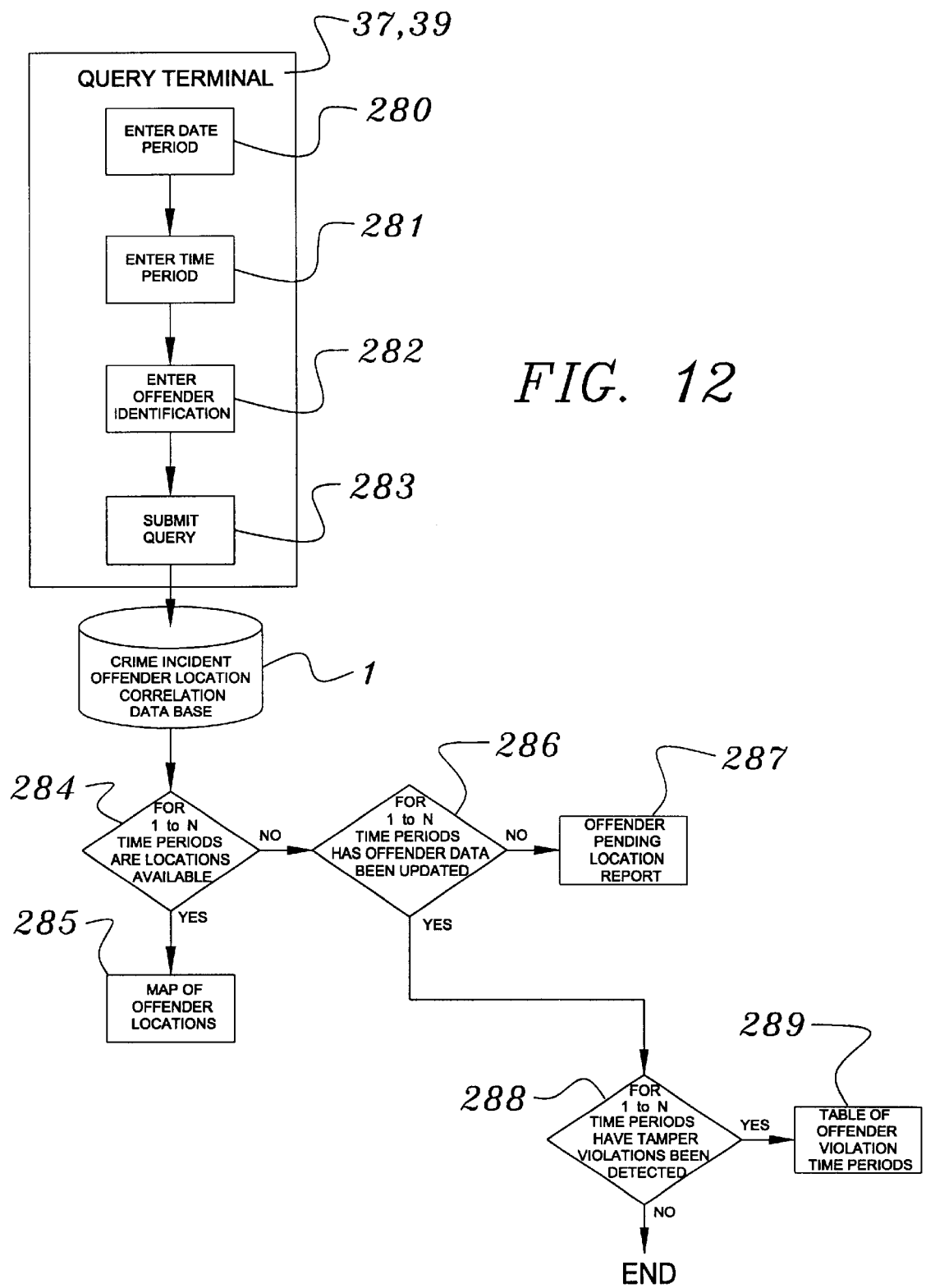
FIG. 12 is a flowchart of the method of operation for the query terminal providing the locations of a subject during a specified time period.

FIG. 12 is a flowchart of the method of operation of the query terminal 37,39 providing the locations of a subject during a specified time period based on the following criteria;

1) Date or range of dates (i.e. spanning midnight, time of crime incident could have occurred in a multiple day interval, etc.),
2) Time period (i.e. the exact time covers multiple hours) and
3) Offender identification and This query is only supported for offenders whose locations are being monitored. The user is prompted for a date or range of dates 280 for the offender location history. No date entry assumes all dates. The user is prompted for a time period 281 for the offender location history. No time period entry assumes 24 hours for the date or range of dates. The user is prompted for the offender identification 282. The user submits the structured query 283 to the crime incident offender location correlation data base 1.

The offender's data from an offender location monitoring system 220 is correlated against the structured offender location query criteria 284. For the times where offender locations are available 284 (i.e. the offender's locations are being monitored and location data is available) a map of offender locations 285 is generated. For the times where offender locations are not available 284, the offender is correlated to see if location data has been updated 286. For those time periods where offender location data has not been updated 286, a table report of pending offender locations during specified times 287 is generated. For the times when the offender's location data has been updated 286 but no location data is available, those times are correlated to see if the offender was intentionally violating by tampering 288 (i.e. not replacing/recharging batteries, not calling in, removing body-worn devices, etc.). For those times with tamper violations 288 for the time query criteria 284, a table report of offender tamper violation times 289 is generated. For those times where location data has been updated 286 but no location data is available and no tamper violations were recorded 288 (i.e. equipment malfunction, between sample intervals for voice recognition/caller identification, etc.), no report is generated.

Figure 13A:
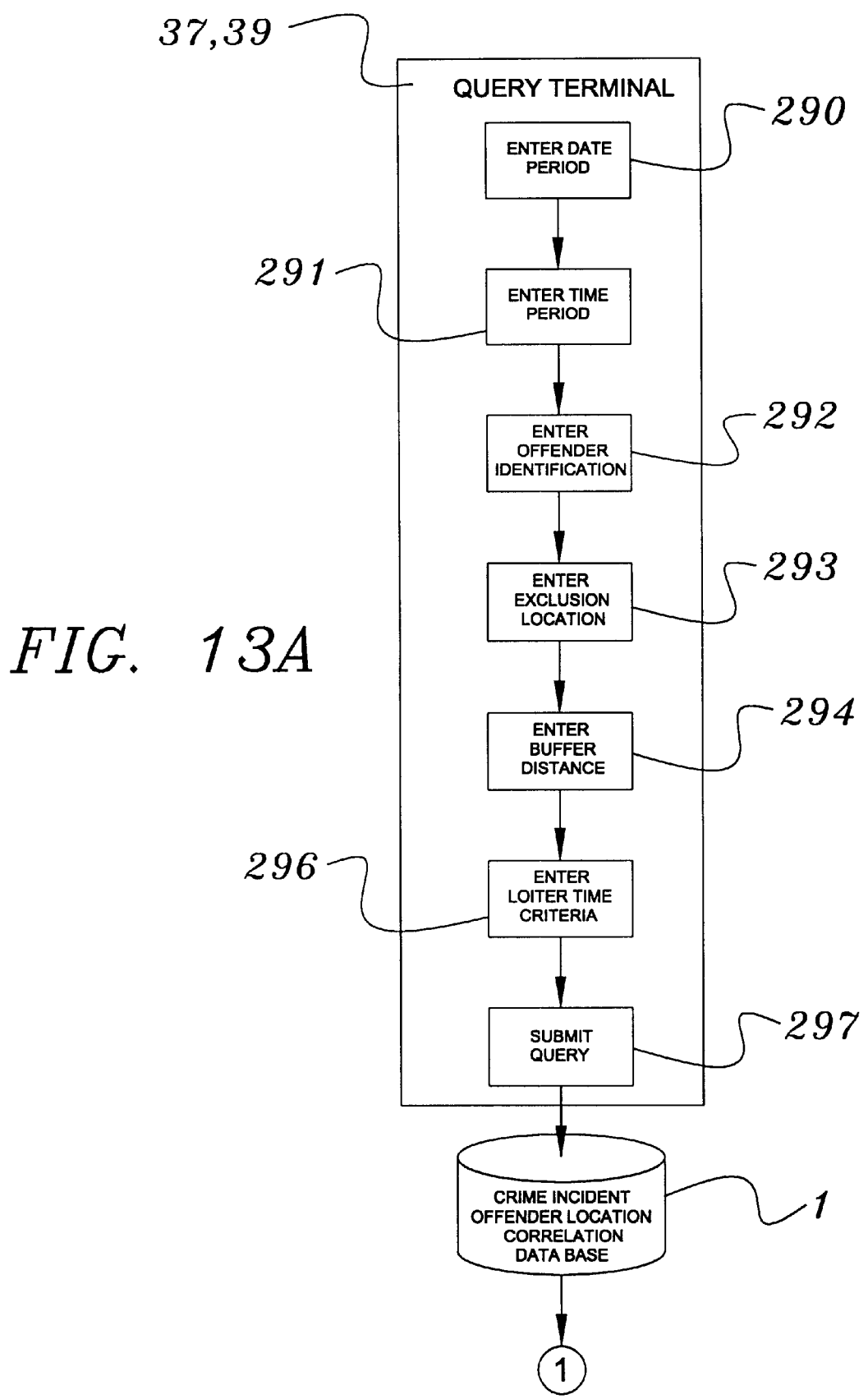
FIG. 13 is a flowchart of the method of operation for the query terminal providing exclusion zone violations for a subject.
Figure 13B:
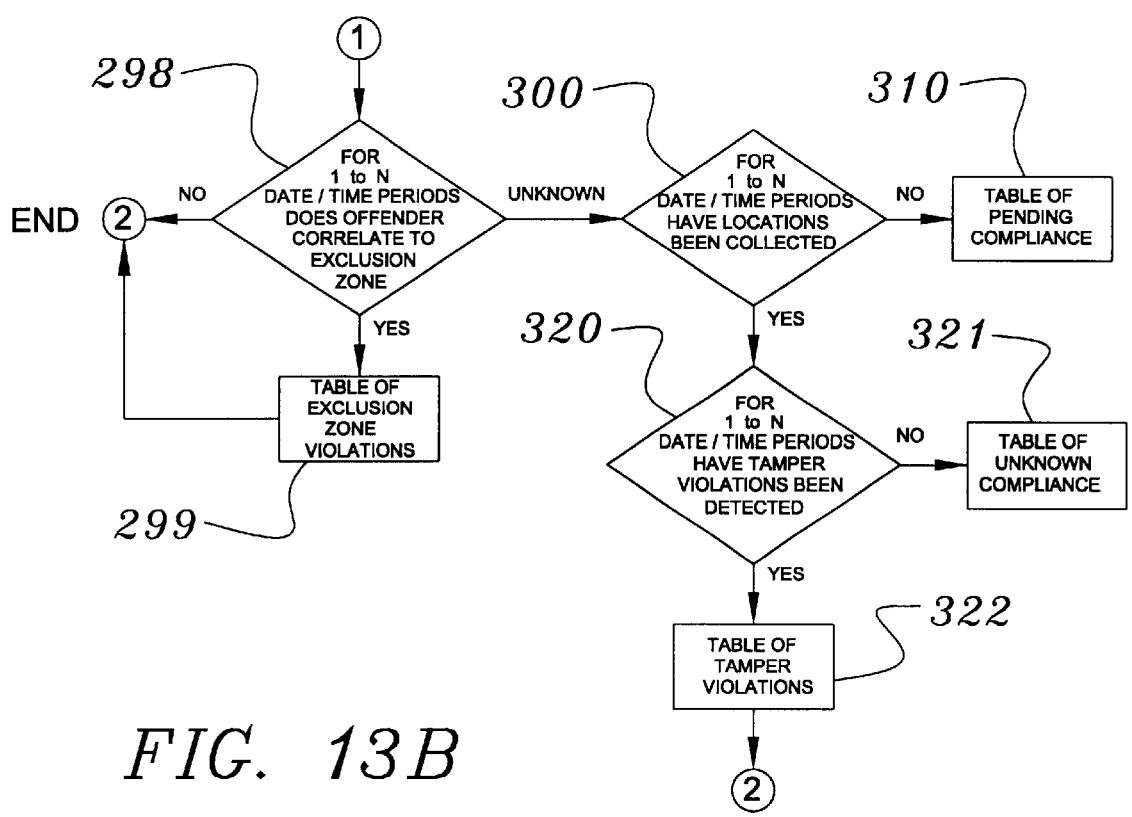

FIG. 13 is a flowchart of the method of operation of the query terminal 37,39 providing exclusion zone violations of a subject during a specified time period based on the following criteria;

1) Date or range of dates (i.e. spanning midnight, time of crime incident could have occurred in a multiple day interval, etc.),
2) Time period (i.e. the exact time covers multiple hours),
3) Offender identification,
4) Exclusion location,
5) Buffer distance and
6) Loiter time.

This query is only supported for offenders whose locations are being monitored. The user is prompted for a date or range of dates 290 for the offender exclusion zone violation history. No date entry assumes all dates. The user is prompted for a time period 291 for the offender exclusion zone violation history. No time period entry assumes 24 hours for the date or range of dates. The user is prompted for the offender identification 292. The user is prompted for the exclusion location 293 by U.S. Postal Service address or by selecting a location on a screen map display. The user is prompted for a buffer distance 294 surrounding the exclusion location thereby creating a zone. The user is prompted for a loiter time 296 since passing through an exclusion zone is permitted but loitering is not (i.e. pedophile driving by a school on the way to work). The user submits the structured query 283 to the crime incident offender location correlation data base 1.

The offender's data from an offender location monitoring system 220 is correlated against the structured offender exclusion zone violation query criteria 298. For the times where offender locations are available for exclusion zone correlation 298 (i.e. the offender's locations are being monitored and location data is available) a table report of offender exclusion zone violations 299 is generated for all exclusion zone violations that correlate with the structured query. For the times where offender locations are not available for exclusion zone correlation 298, the offender is correlated to see if location data has been updated 300. For those time periods where offender location data has not been updated 300, a table report of pending offender exclusion zone compliance during specified times 310 is generated. For the times when the offender's location data has been updated 300 but no location data is available, those times are correlated to see if the offender was intentionally violating by tampering 320 (i.e. not replacing/recharging batteries, not calling in, removing body-worn devices, etc.). For those times with tamper violations 320 for the exclusion zone query criteria 298, a table report of offender tamper violation times 322 is generated. For those times where location data has been updated 300 but no location data is available and no tamper violations were recorded 320 (i.e. equipment malfunction, between sample intervals for voice recognition/caller identification, etc.), a table report for unknown compliance 321 is generated.

Figure 14:
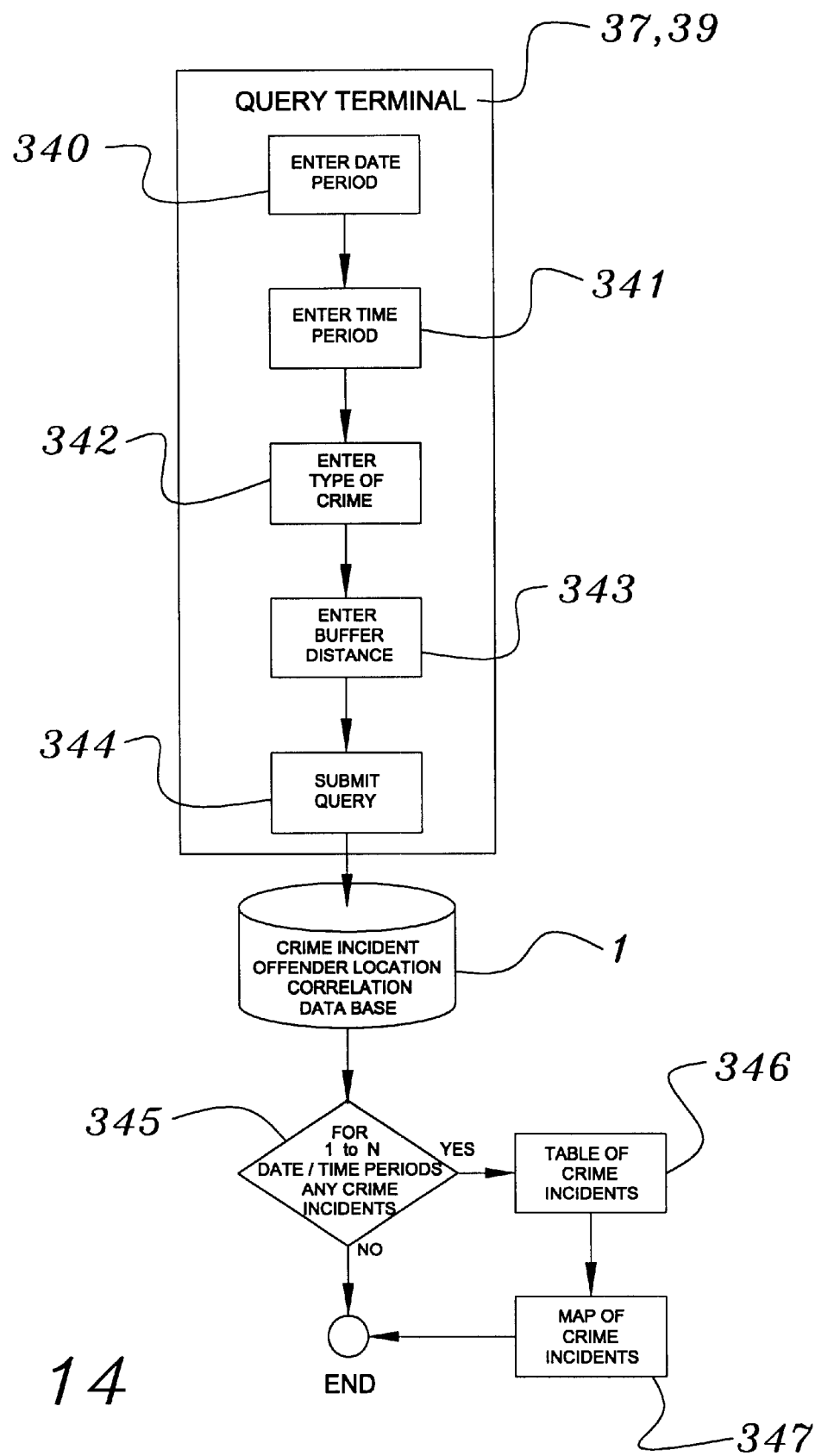
FIG. 14 is a flowchart of the method of operation for the query terminal providing a crime incident map that can span multiple law enforcement jurisdictions over a specified time period.

FIG. 14 is a flowchart of the method of operation of the query terminal 37,39 providing a crime incident map that can span multiple law enforcement jurisdictions during a specified time period based on the following criteria;

1) Date or range of dates (i.e. spanning midnight, time of crime incident could have occurred in a multiple day interval, etc.),
2) Time period (i.e. the exact time covers multiple hours),
3) Type of crime and
4) Buffer distance.

The user is prompted for a date or range of dates 340 for criminal incidence history. No date entry assumes all dates. The user is prompted for a time period 341 for the criminal incidence history. No time period entry assumes 24 hours for the date or range of dates. The use is prompted for the type of crime 342. No crime type assumes all crime incidents. The user is prompted for a buffer distance 343. The buffer distance is a radius from the geographic center of the requesting law enforcement jurisdiction and allows the user to correlate crime incidents from adjacent law enforcement jurisdictions. The user submits the structured query 344 to the crime incident offender location correlation data base 1.

The crime incident data from law enforcement CAD and RMS systems is correlated against the structured crime incident query criteria 345. A table of crime incident locations is generated 346 for crime incidents that correlate to the crime incident structure query 345. A map of crime incident locations is generated 347 for crime incidents that correlate to the crime incident structure query 345.

Figure 15:
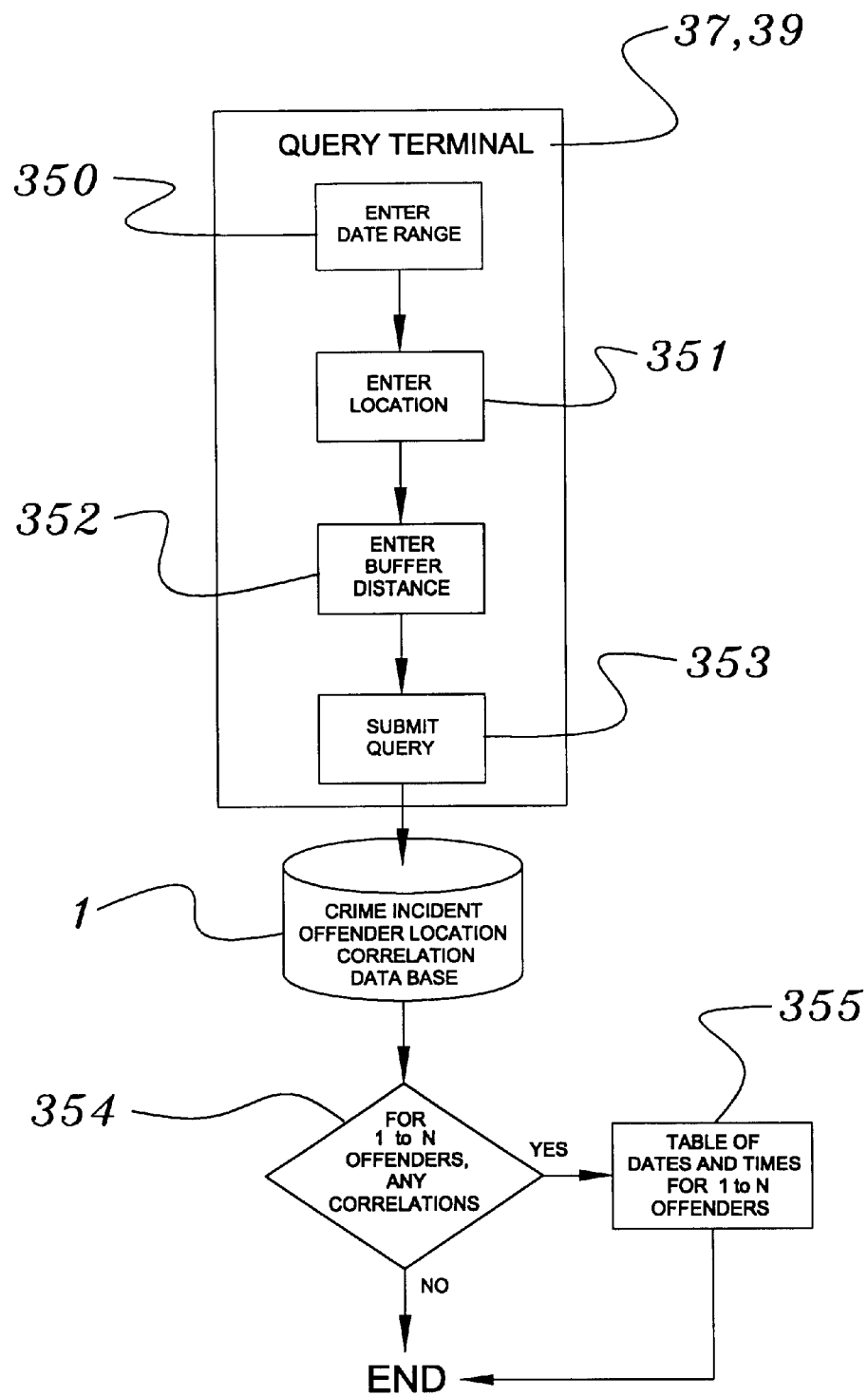
FIG. 15 is a flowchart of the method of operation for the query terminal correlating subjects at a specified location.

FIG. 15 is a flowchart of the method of operation of the query terminal 37,39 providing a subject at a specified location during a specified time period based on the following criteria;

1) Date or range of dates (i.e. spanning midnight, time of crime incident could have occurred in a multiple day interval, etc.),
2) Location and
3) Buffer distance.

This query is only supported for offenders whose locations are being monitored. The user is prompted for a date or range of dates 350 for the offender correlation to a specified location. No date entry assumes all dates. The user is prompted for the specified location 351 by U.S. Postal Service address or by selecting a location on a screen map display. The specified location is not restricted to a court ordered inclusion or exclusion location. and allows the user to correlate offenders with selected locations from adjacent law enforcement jurisdictions. The user is prompted for a buffer distance 352 surrounding the specified location thereby creating a zone. The user submits the structured query 283 to the crime incident offender location correlation data base 1.

The offender's data from an offender location monitoring system 220 is correlated against the structured specified location query criteria 354. For any offenders that correlate to the specified location for the date and buffer distance criteria, a table report of dates and times for offenders at a specified location is generated 355.

Figure 16:
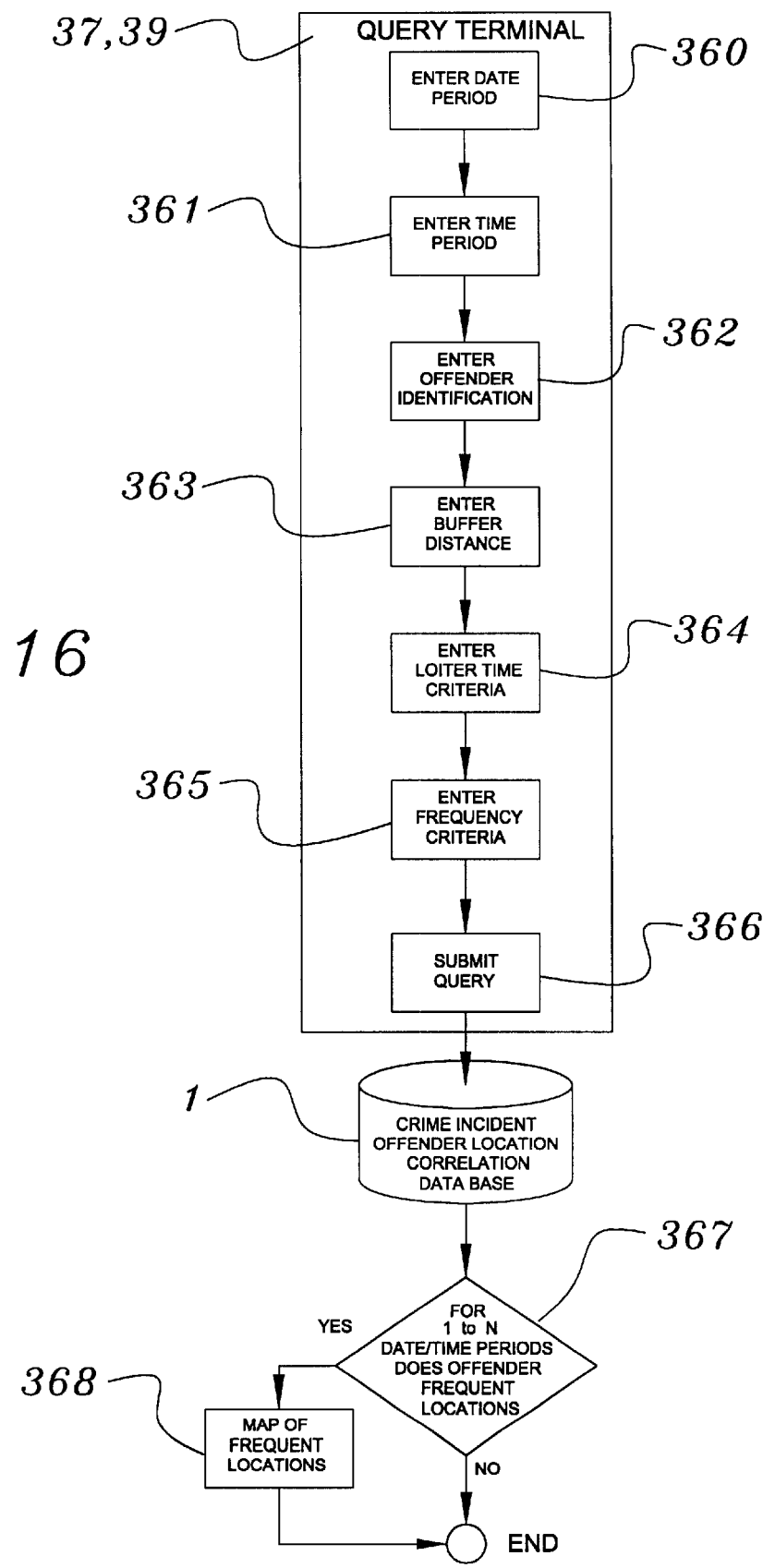
FIG. 16 is a flowchart of the method of operation for the query terminal providing the frequent locations for a subject.

FIG. 16 is a flowchart of the method of operation of the query terminal 37,39 providing the frequent locations of a subject during a specified time period based on the following criteria;

1) Date or range of dates (i.e. spanning midnight, time of crime incident could have occurred in a multiple day interval, etc.),
2) Time period (i.e. the exact time covers multiple hours),
3) Offender identification, 4) Buffer distance, 5) Loiter time and 6) Frequency.

This query is only supported for offenders whose locations are being monitored.

The user is prompted for a date or range of dates 360 for the offender frequent locations. No date entry assumes all dates. The user is prompted for a time period 361 for the offender frequent locations. No time period entry assumes 24 hours for the date or range of dates. The user is prompted for the offender identification 362. The user is prompted for a buffer distance 363 surrounding offender frequent location (s) thereby creating a zone. The user is prompted for a loiter time 364 to establish a loiter time at any location. The user is prompted for frequency criteria 365 to establish how may times during the date or time interval the offender frequents any location. The user submits the structured query 366 to the crime incident offender location correlation data base 1.

The offender's data from an offender location monitoring system 220 is correlated against the structured frequent location query criteria 367. For any offenders that correlate to the frequent location for the date, time, buffer, loiter time, frequency and distance criteria, a map report of dates and times for and offender's frequent location is generated 368.

Figure 17:
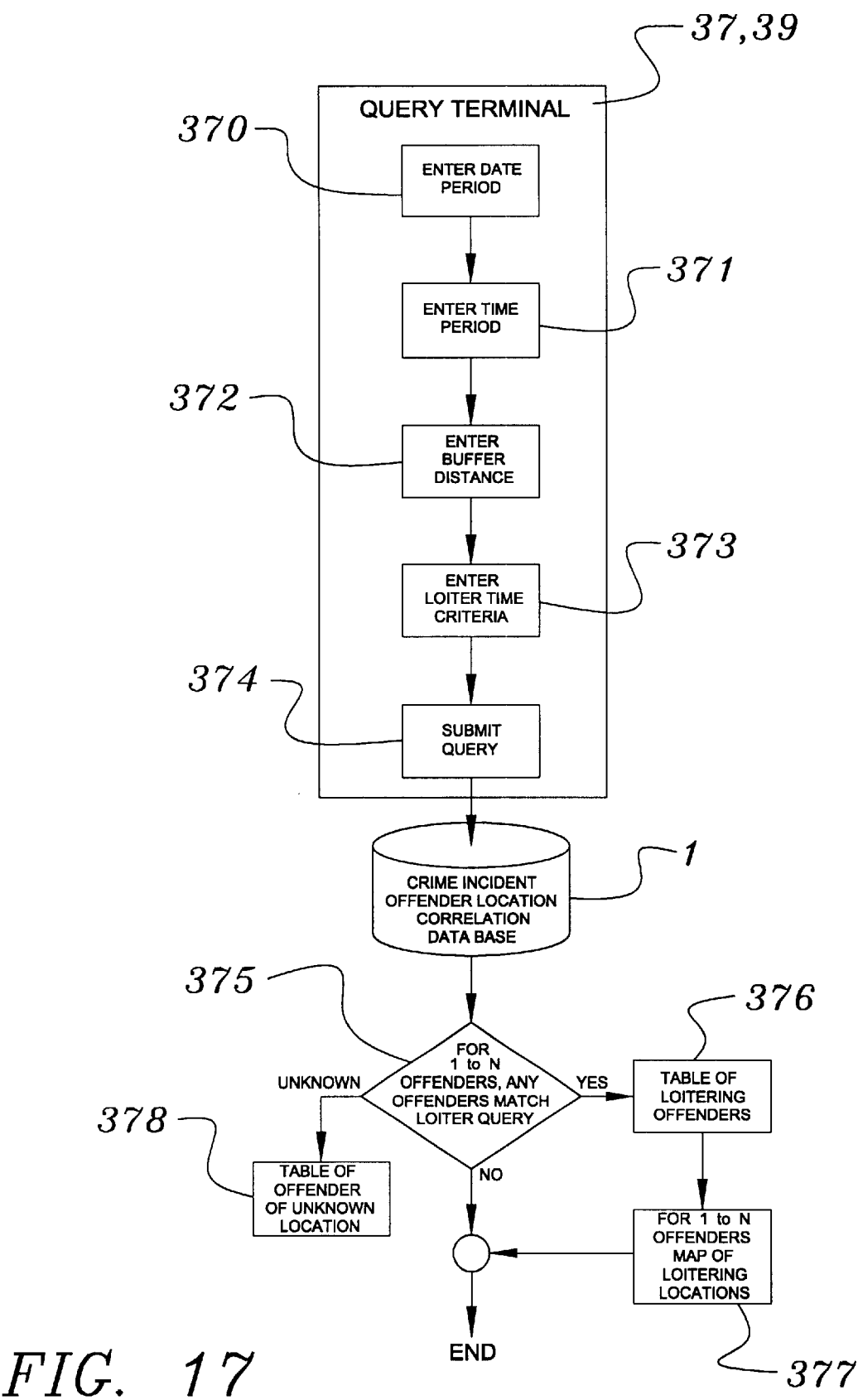
FIG. 17 is a flowchart of the method of operation for the query terminal providing the locations where subjects loiter.

FIG. 17 is a flowchart of the method of operation of the query terminal 37,39 providing locations where offenders loiter during a specified time period based on the following criteria;

1) Date or range of dates (i.e. spanning midnight, time of crime incident could have occurred in a multiple day interval, etc.), 2) Time period (i.e. the exact time covers multiple hours), 3) Buffer distance and 4) Loiter time.

This query is only supported for offenders whose locations are being monitored.

The user is prompted for a date or range of dates 370 for the locations where offenders loiter. No date entry assumes all dates. The user is prompted for a time period 371 for the locations where offenders loiter. No time period entry assumes 24 hours for the date or range of dates. The user is prompted for a buffer distance 372 surrounding the locations where offenders loiter thereby creating a zone. The user is prompted for a loiter time 373 to establish a loiter time at any location. The user submits the structured query 374 to the crime incident offender location correlation data base 1.

The offender's data from an offender location monitoring system 220 is correlated against the structured offender loiter locations query criteria 375. For any offenders that correlate to the loiter criteria for the date, time, buffer and loiter time criteria 375, a table report of loitering offenders 376 and a map report of offender loiter locations is generated 368. For any offenders that have unknown locations during the loiter location times, a table report of offenders with unknown locations is generated 378.

Figure 18:
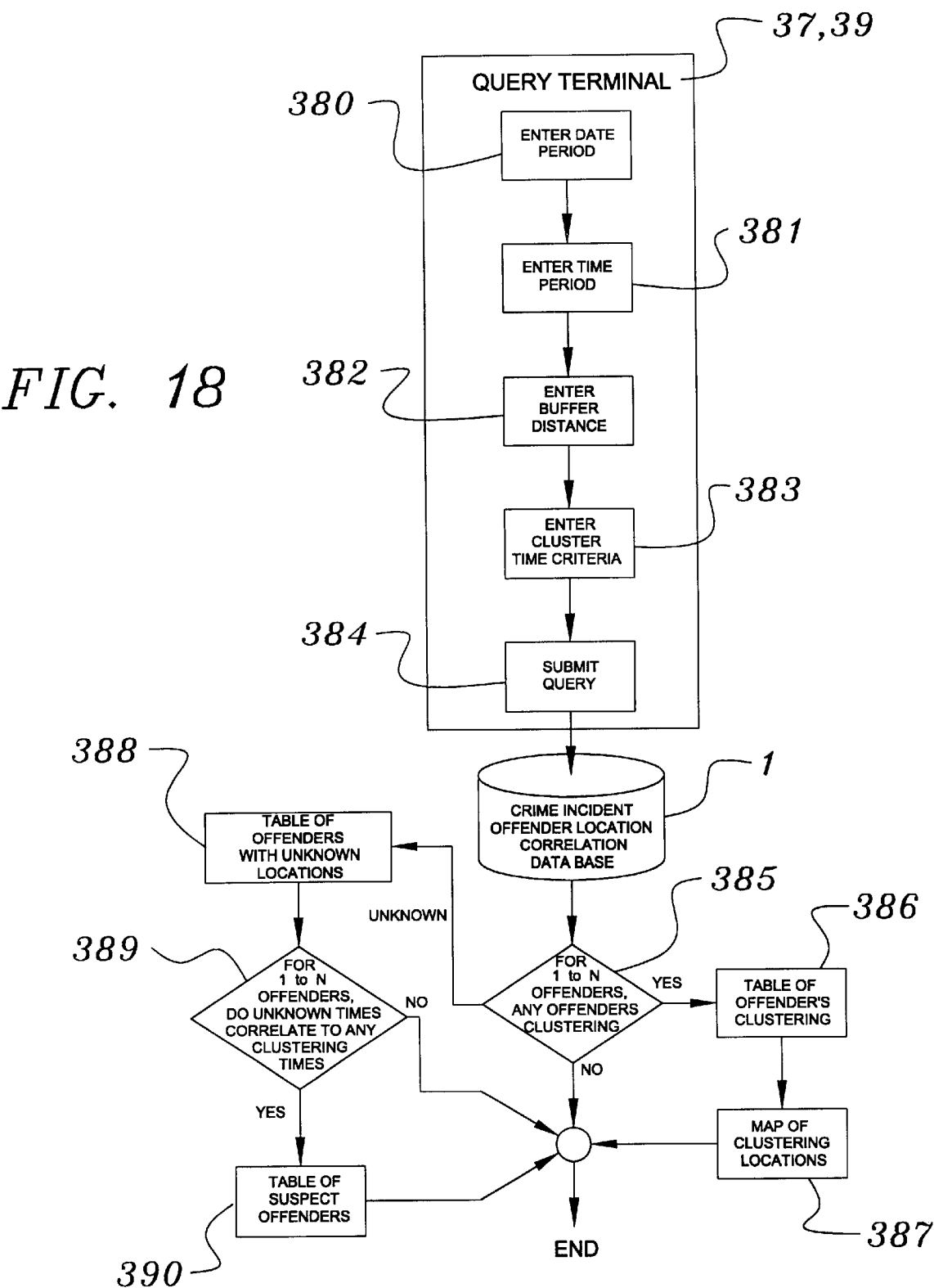
FIG. 18 is a flowchart of the method of operation for the query terminal correlating where subjects cluster.

FIG. 18 is a flowchart of the method of operation of the query terminal 37,39 providing locations where offenders cluster during a specified time period based on the following criteria;

1) Date or range of dates (i.e. spanning midnight, time of crime incident could have occurred in a multiple day interval, etc.), 2) Time period (i.e. the exact time covers multiple hours), 3) Buffer distance and 4) Cluster time.

This query is only supported for offenders whose locations are being monitored.

The user is prompted for a date or range of dates 380 for the locations where offenders cluster. No date entry assumes all dates. The user is prompted for a time period 381 for the locations where offenders cluster. No time period entry assumes 24 hours for the date or range of dates. The user is prompted for a buffer distance 382 surrounding the locations where offenders cluster thereby creating a zone. The user is prompted for a cluster time 383 to establish a cluster time at any location. Since offenders under community supervision may not associate with each other, offender clustering is a location violation with no pre-established location. The user submits the structured query 384 to the crime incident offender location correlation data base 1.

The offender's data from an offender location monitoring system 220 is correlated against the structured offender clustering query criteria 385. For any offenders that correlate to the cluster criteria for the date, time, buffer and cluster time criteria 385, a table report of clustering offenders 386 and a map report of offender clustering locations is generated 378. For any offenders that have unknown locations, a table report of offenders with unknown locations is generated 388. For offender unknown location times that correlate to the clustering location times 389, a table report of suspected clustering offenders is generated 390.

Equivalent elements can be substituted for the elements employed in this invention to obtain substantially the same results in substantially the same way. Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A system for correlating crime incidents with the location of a subject, comprising in combination:

crime incident data containing information about the location and time of at least one crime;

subject location data containing information about the locations at various times of a plurality of subjects;

correlation computer including a correlation database;

means for supplying said crime incident data to said correlation database of said correlation computer;

means for supplying said subject location data to said correlation database said correlation computer;

said correlation computer including means for correlating said crime incident data and said subject location data to determine if each of said subjects are likely suspects of said crime based upon whether each of said subjects were proximate to said location of said crime at said time of said crime.

2. The system as set forth in claim 1, wherein said crime incident data includes crime incident dispatch data obtained from a computer-aided dispatch system.

3. The system as set forth in claim 1, wherein said crime incident data includes crime incident investigative data obtained a from record management system.

4. The system as set forth in claim 1, further comprising in combination:
   historical subject data such as sentencing, demographics and criminal history obtained from an information management system;
   means for supplying said historical subject data to said correlation database of said correlation computer;
   said correlation computer further including means for correlating said historical subject data with said crime incident data and said subject location data to determine whether said likely suspects of said crime are historically likely to have committed said crime based upon said historical subject data of said likely suspects.

5. The system as set forth in claims 1, 2, 3 or 4, wherein said subject location data containing information about the locations at various times of a plurality of subjects is obtained from at least one of a house arrest location system, a location recording system employing a positioning system, a continuous location monitoring system employing a frequency triangular location system, voice recognition with caller identification system, or a cellular triangular location system.

6. The system as set forth in claims 1, 2, 3 or 4, wherein said correlation computer further includes means for producing correlation queries based upon predetermined criteria.

7. The system as set forth in claims 1, 2, 3 or 4, wherein said correlation computer further includes means for producing correlation queries based upon selective criteria.

8. The system as set forth in claim 6, wherein said correlation computer further includes means for producing correlation reports based upon said correlation queries.

9. The system as set forth in claim 5, wherein said location recording system, comprises in combination:
   a body-worn case with a tamper resistant seal for connection to said subject, said case containing
   a battery compartment allowing replacement of a battery contained therein without removal of said case from said subject,
   means for charging said battery,
   a location positioning system, and
   a transmitter for transmitting position information from said location positioning system; and
   a residence interface system including means for receiving said position information from said location positioning system and means for providing said position information to form a part of said subject location data.

10. The system as set forth in claim 9, wherein said charging means comprises a swinging power generator incorporated into said case for charging said battery upon being swung.

11. The system as set forth in claim 9, wherein said charging means comprises a solar cell mounted relative to said case.

12. The system as set forth in claim 9, wherein said case is in the form to be worn on the subject's wrist.

13. The system as set forth in claim 9, further including means for providing dead reckoning information to said location positioning system.

14. The system as set forth in claim 9, wherein said transmitter for transmitting position information from said location positioning system comprises an infrared transmitter and wherein said means for receiving said position information from said location positioning system comprises an infrared receiver.

15. The system as set forth in claims 1, 2, 3 or 4, wherein said subject location data containing information about the locations at various times of a plurality of subjects further includes tampering data containing information about tampering and wherein said correlation computer further including means for correlating said tampering data with said crime incident data to determine whether said likely suspects of said crime are more likely to have committed said crime based upon said tampering data.

16. The system as set forth in claims 1, 2, 3 or 4, wherein said subject location data further includes unknown location data indicative of undeterminable locations of said subjects at various times wherein said correlation computer further including means for correlating said unknown location data with said crime incident data to determine whether said likely suspects of said crime are more likely to have committed said crime based upon said unknown position data.

17. The system as set forth in claim 7, wherein said crime incident data contains multiple crime incident data about the location and time of a plurality of crimes and wherein said selective criteria of said correlation queries includes said multiple crime incident data.

18. The system as set forth in claim 17, wherein said selective criteria includes for each crime incident, a date or range of dates, a time period, a crime incident identification and buffer distance around crime incident location.

19. The system as set forth in claim 7, wherein said selective criteria of said correlation queries includes a date or range of dates, a time period and subject identification.

20. The system as set forth in claim 7, wherein said subject location data contains exclusion zone data defining a zone of exclusion and wherein said selective criteria of said correlation queries includes said exclusion zone data.

21. The system as set forth in claim 20, wherein said selective criteria includes a date or range of dates, a time period, subject identification, exclusion location, buffer distance and loiter time.

22. The system as set forth in claim 7, wherein said selective criteria includes a crime incident map based upon a date or range of dates, a time period, a type of crime and a buffer distance.

23. The system as set forth in claim 7, wherein said selective criteria includes frequent locations of said subject based upon a date or range of dates, a time period, subject identification, buffer distance, loiter time and frequency.

24. The system as set forth in claim 7, wherein said selective criteria includes loitering locations based upon a date or range of dates, a time period, buffer distance and loiter time.

25. The system as set forth in claim 7, wherein said selective criteria includes clustering locations based upon a date or range of dates, a time period, buffer distance and cluster time.

26. A system to correlate crime incidents with a subject's location using crime incident data and an electronic apparatus means for locating the subject.

27. A system to correlate crime incidents with a subject's location using crime incident data and a non-removable, tamper resistant, body worn subject location recording device for use in a communications system, the body worn location recording device determining its own spatial coordinates, conveying its spatial coordinates to a central database system, the body worn location recording device comprising a housing enclosing:
   a means to detect tampering with the body worn location recording device, a location means for determining the spatial coordinates of the body worn location recording device, memory and a processor for use with algorithms to generate instructional commands to an offender, store spatial coordinates, transfer stored spatial coordinates to said central data base system, accept commands and data from a central database facility and monitor health and status of said location recording device, a means to communicate using infrared wireless communications to a central data base system using an infrared transceiver attached to a wide area communications network, a means to communicate using circuit switched connection oriented digital and analog wireless signals with the central data base system, and a means to communicate with the person wearing the body worn device or with the portable tracking device.

28. A location recording system, comprises in combination:

a body-worn case with a tamper resistant seal for connection to a subject, said case containing a battery compartment allowing replacement of a battery contained therein without removal of said case from said subject, means for charging said battery, a location positioning system for producing subject location data, and a transmitter for transmitting subject location data from said location positioning system; and a residence interface system including means for receiving said subject location data from said location positioning system and means for providing said subject location data to a monitoring system.

29. The system as set forth in claim 28, wherein said charging means comprises a swinging power generator incorporated into said case for charging said battery upon being swung.

30. The system as set forth in claim 28, wherein said charging means comprises a solar cell mounted relative to said case.

31. The system as set forth in claim 28, wherein said case is in the form to be worn on the subject's wrist.

32. The system as set forth in claim 28, further including means for providing dead reckoning information to said monitoring system.

33. The system as set forth in claim 28, wherein said transmitter for transmitting said subject location data from said location positioning system comprises an infrared transmitter and wherein said means for receiving said subject location data from said location positioning system comprises an infrared receiver.

34. The system as set forth in claims 28, 29, 30, 31, 32 or 33, wherein said monitoring system comprises a system for correlating crime incidents with said subject location data including crime incident data containing information about the location and time of at least one crime and means for correlating said crime incident data and said subject location data to determine if each of said subjects are likely suspects of said crime based upon whether each of said subjects were proximate to said location of said crime at said time of said crime.

35. A method for correlating crime incidents with a subjects' location, comprising the steps of:

providing a correlation computer including a correlation database;

supplying crime incident data to said correlation database;

supplying subject location data to said correlation database;

correlating said crime incident data and said subject location data to determine if each of said subjects are likely suspects of said crime based upon whether each of said subject were proximate to said location of said crime at said time of said crime.

36. The method as set forth in claim 35, wherein said crime incident data includes crime incident dispatch data obtained from a computer-aided dispatch system.

37. The method as set forth in claims 35, wherein said crime incident data includes crime incident investigative data obtained a from record management system.

38. The method as set forth in claims 35, 36 or 37, further comprising the steps of:

supplying historical subject data to said correlation database;

correlating said historical subject data with said crime incident data and said subject location data to determine whether said likely suspects of said crime are historically likely to have committed said crime based upon said historical subject data of said likely suspects.

39. The method as set forth in claims 35, 36 or 37, wherein said subject location data containing information about the locations at various times of a plurality of subjects is obtained from at least one of a house arrest location system, a location recording system employing a positioning system, a continuous location monitoring system employing a frequency triangular location system, voice recognition with caller identification system, or a cellular triangular location system.

40. The method as set forth claims 35, 36 or 37, further including the step of producing correlation queries based upon predetermined criteria.

41. The method as set forth in claims 35, 36 or 37, further including the step of producing correlation queries based upon selective criteria.

42. The method as set forth in claim 41, further including the step of producing correlation reports based upon said correlation queries.

43. The method as set forth in claims 35, 36 or 37, further including the step of correlating tampering data with said crime incident data to determine whether said likely suspects of said crime are more likely to have committed said crime base upon said tampering data.

44. The method as set forth in claims 35, 36 or 37, further including the step of correlating unknown location data with said crime incident data to determine whether said likely suspects of said crime are more likely to have committed said crime based upon said unknown position data.

* * * * *

(12) EX PARTE REEXAMINATION CERTIFICATE (7898th)
United States Patent
Layson et al.

(10) Number: US 6,405,213 C1
(45) Certificate Issued: Nov. 30, 2010

(54) SYSTEM TO CORRELATE CRIME INCIDENTS WITH A SUBJECT'S LOCATION USING CRIME INCIDENT DATA AND A SUBJECT LOCATION RECORDING DEVICE

(75) Inventors: Hoyt M. Layson, Palm Harbor, FL (US); Gregory A. Frost, Tallahassee, FL (US)

(73) Assignee: Correlation Partners, LLC, Tallahassee, FL (US)

Reexamination Request:
No. 90/008,047, May 16, 2006

Reexamination Certificate for:
Patent No.: 6,405,213
Issued: Jun. 11, 2002
Appl. No.: 09/330,858
Filed: Jun. 11, 1999

Related U.S. Application Data

(63) Continuation-in-part of application No. 09/181,244, filed on Oct. 28, 1998, now Pat. No. 6,014,080, which is a continuation-in-part of application No. 09/082,313, filed on May 2, 1998, now Pat. No. 5,982,281, which is a continuation-in-part of application No. 08/863,158, filed on May 27, 1997, now Pat. No. 5,959,533.

(51) Int. Cl.
G08B 21/02 (2006.01)
G08B 21/22 (2006.01)
G08B 21/00 (2006.01)
G07C 9/00 (2006.01)

(52) U.S. Cl. .................. 707/104.1; 707/999.107; 340/539.1; 340/539.13; 340/573.1

(58) Field of Classification Search .............. 706/45–48; 707/100, 104.1
See application file for complete search history.

(56) References Cited

U.S. PATENT DOCUMENTS

| | | | |
|---|---|---|---|
| 5,461,390 A | 10/1995 | Hoshen | |
| 5,731,757 A | 3/1998 | Layson, Jr. | |
| 5,781,704 A | * 7/1998 | Rossmo | 706/45 |
| 5,867,103 A | 2/1999 | Taylor, Jr. | |
| 5,959,533 A | 9/1999 | Layson, Jr. et al. | |
| 5,982,281 A | 11/1999 | Layson, Jr. | |
| 6,014,080 A | 1/2000 | Layson, Jr. | |

OTHER PUBLICATIONS

"Query" Dictionary definition from Webpedia Online encyclopedia dedicated to computer technology.*
"Modus operandi" Dictionary definition from Wikipedia, the free encyclopedia.*
Current Electronic Monitoring Market Place Presentation, 1995–1996 (Exhibit D).
Pro Tech Monitoring, Inc. SMART™ System Briefing, 1995–1996 (Exhibit E).
Concept Overview, Crime Prevention through Advanced Technology Proposal May 1998 (Exhibit F).
Florida Crime TRAX Concept Briefing, Jun. 4, 1994 (Exhibit G).
Excerpts of Deposition of Gregory A. Frost, in the matter of *Satellite Tracking of People, LLC, v. Pro Tech Monitoring, Inc., v. Gregory A. Frost, Hoyt M. Layson and Correlation Partners, LLc*, in the United States District Court for the Middle District of Tennessee, Mar. 23, 2006 (Exhibit H).

* cited by examiner

Primary Examiner—Anjan K. Deb

(57) ABSTRACT

A system for correlating crime incidents with the location of a subject in which crime incident data containing information about the location and time of at least one crime and subject location data containing information about the locations at various times of a plurality of subjects are provided to a correlation database of a computer, whereupon the correlation computer correlates the crime incident data and the subject location data to determine if each of said subjects are likely suspects of said crime based upon whether each of the subjects were proximate to the location of the crime at the time of the crime.

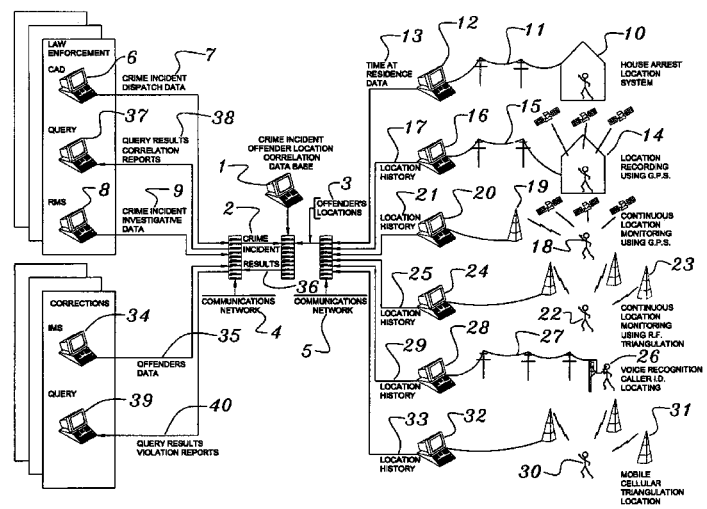

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 27-34 and 43-44 is confirmed.

Claims 1-26 and 35-42 are cancelled.

\* \* \* \* \*